(12) United States Patent
Nowak-Przygodzki et al.

(10) Patent No.: US 11,361,539 B2
(45) Date of Patent: *Jun. 14, 2022

(54) SYSTEMS, METHODS, AND APPARATUS FOR PROVIDING IMAGE SHORTCUTS FOR AN ASSISTANT APPLICATION

(71) Applicant: Google LLC, Mountain View, CA (US)

(72) Inventors: Marcin Nowak-Przygodzki, Bäch (CH); Gökhan Bakir, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/850,294

(22) Filed: Apr. 16, 2020

(65) Prior Publication Data
US 2020/0250433 A1 Aug. 6, 2020

Related U.S. Application Data

(63) Continuation of application No. 16/459,869, filed on Jul. 2, 2019, now Pat. No. 10,657,374, which is a (Continued)

(51) Int. Cl.
*G06V 20/20* (2022.01)
*G06F 16/9032* (2019.01)
(Continued)

(52) U.S. Cl.
CPC ............ *G06V 20/20* (2022.01); *G06F 3/005* (2013.01); *G06F 3/017* (2013.01); *G06F 3/0304* (2013.01);
(Continued)

(58) Field of Classification Search
CPC . G06K 9/00671; G06F 16/9032; G06F 3/017; G06F 3/0304; G06F 3/005;
(Continued)

(56) References Cited

U.S. PATENT DOCUMENTS 8,929,877 B2 1/2015 Rhoads et al.
9,190,075 B1 11/2015 Cronin
(Continued)

FOREIGN PATENT DOCUMENTS

JP 2015228097 12/2015
JP 2017120556 7/2017
(Continued)

OTHER PUBLICATIONS

Murphy, M. "Everything Google announced at its 2017 I/O Conference"; Retrieved from internet: URL:https://qz.com/985799/what-google-announced-at-its-2017-IO-conference-keynote-goog/ [retrieved on Nov. 7, 2018]; 12 pages May 17, 2017.
(Continued)

*Primary Examiner* — Shahbaz Nazrul
(74) *Attorney, Agent, or Firm* — Middleton Reutlinger

(57) ABSTRACT

Methods, apparatus, systems, and computer-readable media are set forth for generating and/or utilizing image shortcuts that cause one or more corresponding computer actions to be performed in response to determining that one or more features are present in image(s) from a camera of a computing device of a user (e.g., present in a real-time image feed from the camera). An image shortcut can be generated in response to user interface input, such as a spoken command. For example, the user interface input can direct the automated assistant to perform one or more actions in response to object(s) having certain feature(s) being present in a field of view of the camera. Subsequently, when the user directs their camera at object(s) having such feature(s), the assistant application can cause the action(s) to be automatically performed. For example, the assistant application can cause data to be presented and/or can control a remote device in accordance with the image shortcut.

15 Claims, 12 Drawing Sheets

Related U.S. Application Data continuation of application No. 15/700,104, filed on Sep. 9, 2017, now Pat. No. 10,366,291.

(51) Int. Cl.

| | | |
|---|---|---|
| *G06F 3/0481* | (2022.01) | |
| *G06F 3/16* | (2006.01) | |
| *H04N 5/232* | (2006.01) | |
| *G06F 3/01* | (2006.01) | |
| *G06F 3/03* | (2006.01) | |
| *G06F 3/00* | (2006.01) | |
| *G06F 9/451* | (2018.01) | |
| *G06F 16/58* | (2019.01) | |

(52) U.S. Cl.
CPC ............ *G06F 3/0481* (2013.01); *G06F 3/167* (2013.01); *G06F 9/453* (2018.02); *G06F 16/5866* (2019.01); *G06F 16/9032* (2019.01); *H04N 5/23293* (2013.01)

(58) Field of Classification Search
CPC .... G06F 9/453; G06F 16/5866; G06F 3/0481; G06F 3/167; H04N 5/23293; G06V 20/20
See application file for complete search history.

(56) References Cited

U.S. PATENT DOCUMENTS

| | | | | |
|---|---|---|---|---|
| 9,823,811 | B2* | 11/2017 | Brown | G06Q 30/016 |
| 10,462,359 | B1 | 10/2019 | Rajvanshi et al. | |
| 10,748,546 | B2* | 8/2020 | Kim | G10L 15/30 |
| 2008/0267504 | A1 | 10/2008 | Schloter et al. | |
| 2009/0237546 | A1 | 9/2009 | Bloebaum et al. | |
| 2011/0216179 | A1 | 9/2011 | Dialameh et al. | |
| 2012/0035924 | A1 | 2/2012 | Jitkoff et al. | |
| 2012/0265528 | A1 | 10/2012 | Gruber et al. | |
| 2013/0147970 | A1 | 6/2013 | Herring et al. | |
| 2014/0300466 | A1 | 10/2014 | Park et al. | |
| 2015/0123992 | A1 | 5/2015 | Mahan et al. | |
| 2015/0213355 | A1* | 7/2015 | Sharma | G06F 3/167 706/11 |
| 2015/0286698 | A1* | 10/2015 | Gagnier | G06F 3/04842 707/736 |
| 2016/0070581 | A1* | 3/2016 | Soon-Shiong | G06F 9/453 715/706 |
| 2017/0311053 | A1 | 10/2017 | Ganjam et al. | |
| 2017/0374176 | A1 | 12/2017 | Agrawal et al. | |
| 2018/0121432 | A1 | 5/2018 | Parson et al. | |
| 2018/0336045 | A1 | 11/2018 | Badr | |
| 2019/0095069 | A1* | 3/2019 | Proctor | G06F 9/453 |

FOREIGN PATENT DOCUMENTS

| | | |
|---|---|---|
| JP | 2017523492 | 8/2017 |
| WO | 2015183401 | 12/2015 |
| WO | 2014181380 A1 | 2/2017 |
| WO | 2017070121 | 4/2017 |

OTHER PUBLICATIONS

Wallen, J. "How to create Google Assistant Shortcuts"; TechRepublic; retrieved from internet: URL:https://www.techrepublic.com/article/how-to-create-google-assistant-shortcuts/ [retrieved on Nov. 8, 2018]; 9 pages May 23, 2017.

European Patent Office; International Search Report and Written Opinion of PCT Ser No. PCT/US2018/050039; 17 pages Nov. 26, 2018.

Korean Intellectual Property Office; Notice of Office Action issue in Application No. 1020197036639; 74 pages; dated Dec. 9, 2020.

Japanese Patent Office; Notices of Reasons of Rejection issued in Application No. 2019-568314; 10 pages; dated Mar. 29, 2021.

Sugimura, K.; Introduction to Sekai Camera-try to add tags to the world; ITmedia Inc.; dated Sep. 30, 2009.

Villa-Boas, A.; Google new Lens product uses your phone's camera to do clever tricks, like connecting your phone to a WiFi network; Insider; dated May 18, 2017.

Korean Intellectual Property Office; Notice of Allowance issue in Application No. 1020197036639; 3 pages; dated Jun. 16, 2021.

European Patent Office; Communication Pursuant to Article 94(3) EPC issued in Application No. 18786451.7; 8 pages; dated Feb. 17, 2021.

Intellectual Property India; Office Action issued in Application No. 201927049574; 7 pages; dated Jun. 22, 2021.

Japanese Patent Office; Notice of Allowance issued in Application No. 2019-568314; 3 pages; dated Sep. 13, 2021.

Japanese Patent Office; Notice of Reasons for Rejection issued in Application No. 2021-164807; 8 pages; dated Nov. 8, 2021.

The Korean Intellectual Property Office; Notice of Office Action issued in Application No. 10-2021-7028074; 12 pages; dated Nov. 25, 2021.

European Patent Office; Intention to Grant issued in Application No. 18786451.7, 56 pages, dated Mar. 25, 2022.

Japanese Patent Office; Notice of Allowance issued in Application No. 2021-164807, 10 pages, dated Feb. 28, 2022.

* cited by examiner

SYSTEMS, METHODS, AND APPARATUS FOR PROVIDING IMAGE SHORTCUTS FOR AN ASSISTANT APPLICATION

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e. utterances) which may in some cases be converted into text and then processed, and/or by providing textual (e.g., typed) natural language input. Although the use of automated assistants can allow for easier access to information and more convenient means for controlling peripheral devices, providing spoken inputs and/or textual commands can be arduous in certain situations. For instance, a user may not want to provide spoken commands to an automated assistant application in the morning when other persons in their household may be sleeping. These and other issues can arise from a dependence of assistant applications on spoken commands. However, there may be ways of providing more elaborate commands, providing commands with less arduous inputs, providing commands that protect the privacy of a corresponding user, and/or providing commands with additional or alternative benefits.

SUMMARY

Implementations disclosed herein relate to generating and utilizing image shortcuts that cause one or more corresponding computer actions to be performed in response to determining that one or more features are present in image(s) from a camera of a computing device of a user (e.g., present in a real-time image feed from the camera). In various implementations, an image shortcut is generated and stored in association with a user in response to spoken and/or typed user interface input provided by the user. For example, the user can provide, to an automated assistant application, spoken input of "when I direct the camera at a train platform, give me a train schedule". In response to the spoken input, an image shortcut can be generated that causes train schedule information to be graphically and/or audibly presented at a computing device of the user in response to determining that a real-time image feed from a camera of the computing device captures image(s) having feature(s) indicative of a "train platform". For example, a future image captured via a computing device can be processed (locally at the computing device and/or remotely) to identify feature(s) that indicate a "train platform" such as: a classification of the image as a "train platform" image; classification(s) of portion(s) of the image such as "train", "people", "crowd", "train tracks", and/or other classifications indicative of a "train platform"; etc. It can be determined that the future image captures a "train platform" based on the presence of such features, and train schedule information presented in response. The train schedule information can be presented audibly and/or graphically at the same computing device that captured the image, and/or presented at another computing device that is linked (e.g., through a user account used at both computing devices, based on both computing devices being connected to the same network) to the computing device that captured the image. In some implementations, a current location of the computing device and/or other contextual data can also be utilized to determine that the image captures a "train platform". For example, determining that the image captures a train platform can be based on both: determining that feature(s) of the image are indicative of a "train platform"; and determining that the current location of the computing device has a "train station" classification. Various image processing techniques can be utilized to determine classification(s) and/or other features of images. For example, some techniques can utilize a deep neural network model that accepts an image as input, and that utilizes learned parameters to generate, as output based on the image, measure(s) that indicate which of a plurality of corresponding features are present in an image.

In some implementations, computer action(s) to be performed for an image shortcut include generating a query, transmitting the generated query, receiving responsive data in response to transmitting the query, and/or presenting all or portions of the responsive data. In some of those implementations, the image shortcut is associated with a query or query template that indicates a type of data to be provided according to the image shortcut. For example, and continuing with the "train platform" example above, the generated image shortcut can define a query of "train schedule", a query template of "train schedule for [current location]", or a query template of "train schedule from [current location] to [destination location]". In the query templates, the placeholder "[current location]" can be filled in with the current location of the computing device. The current location can be a particular coordinate, a geographic area, or text or other information that indicates the train station where the computing device is currently located. The placeholder "[destination location]" can be filled in with a contextually relevant destination, such as a "work" destination for the user if it is in the morning on a weekday, a "home" destination for the user if it is in the evening on a weekday, an "appointment" location for the user that corresponds to a temporally close appointment stored in an electronic calendar of the user, etc. In some of those implementations, the query or a "filled in" query template can be utilized to determine train schedule information to provide in response to determining that an image captures a train platform. For example, the query or filled in query template can be transmitted to a search engine, an application, and/or other resource(s), a responsive train schedule received in response, and the responsive train schedule audibly or graphically presented.

In some implementations, computer action(s) to be performed for an image shortcut additionally and/or alternatively include transmitting one or more commands that cause the state of one or more peripheral devices (e.g., Internet of Things (IoT) devices) to be altered. For example, a user can provide, to an automated assistant application, spoken input of "when I direct the camera at my alarm clock in the morning, turn on my bedroom lights and turn on my coffee maker plug". In response to the spoken input, an image shortcut can be generated that, in response to determining that a real-time image feed from a camera of a computing device of the user captures image(s) having feature(s) indicative of any "alarm clock" (or the user's particular alarm clock), causes the user's "bedroom lights" and "coffee maker plug" to turn on. For example, the image shortcut can, in response to making the determination, cause a command to be transmitted that causes networked lights, that are labeled as "bedroom lights", to be turned "on", and that also causes a command to be transmitted that causes a networked plug, that is labeled as "coffee maker plug", to be turned on. One or more application programming interfaces (APIs) and/or other communication protocols can be utilized in generating and/or transmitting commands that cause a state of a device to be altered. In some implementations, the image shortcut causes the "bedroom lights" and the "coffee maker plug" to be turned on based on determining the image(s) have feature(s) indicative of an alarm clock, and that the image(s) are captured in "the morning" (e.g., based on the spoken input including "in the morning") and/or that the image(s) are captured at a "home" location of the user (e.g., based on the spoken input including "my alarm clock"). Further, in some implementations, the automated assistant, when generating the image shortcut, can prompt the user to capture image(s) of the user's particular alarm clock, and thereafter trigger the image shortcut only in response to a real-time image feed capturing image(s) that have feature(s) that match feature(s) of the user's particular alarm clock (as derived from the image(s) captured in response to the prompt).

In some implementations, computer action(s) to be performed for an image shortcut additionally and/or alternatively include transmitting one or more electronic communications to other users. For example, a user can provide, to an automated assistant application, spoken input of "when I direct the camera at my car key while at work, give me a traffic update and text the traffic update to my wife". In response to the spoken input, an image shortcut can be generated that, in response to determining that the user is at work, and that a real-time image feed from a camera of a computing device of the user captures image(s) having feature(s) indicative of a "car key", causes a traffic update to a presented at the computing device (and/or another computing device of the user), and causes a text message that includes the traffic update to be automatically generated and automatically transmitted to a "wife" contact of the user.

As another example of implementations disclosed herein, while performing his/her morning routine, a user may wish to see their agenda, as stored on their portable computing device. Although the user could invoke their automated assistant using a spoken command to see the agenda (e.g., "Assistant, could you please show me my agenda?"), the user can instead configure the automated assistant to automatically provide the agenda when a camera of the portable computing device is directed at an object having one or more particular features. The user can configure this setting using a spoken command such as, for example, "Assistant, when I direct the camera at a mirror in the morning, please display my agenda." In response, the automated assistant can cause the spoken command to be parsed in order to identify text related to a new image shortcut configuration. The new image shortcut configuration can then be generated and stored for use at a later time. For example, the new image shortcut configuration can cause the user's current agenda to be audibly and/or graphically provided to the user via the portable computing device in response to determining: it is currently "the morning"; and that image(s) captured by the camera include a mirror. For instance, the following morning, the user can open a camera application on their portable computing device and direct the camera to their mirror. In response to it being "the morning" and the camera being directed to a mirror, the automated assistant can cause the user's agenda for the day to be presented at the portable computing device.

In various implementations, the above and other techniques described herein enable a user to interact with an automated assistant and obtain relevant output from the automated assistant without requiring arduous typed input to be provided by the user and/or without requiring the user to provide spoken input that could cause privacy concerns (e.g., if other individuals are nearby). Further, various implementations can reduce the number of inputs required to obtain relevant output relative to other techniques, which may conserve client device computational resources and/or assist users with speech and/or dexterity issues. Additionally, various implementations disclosed herein perform processing of images locally at a client device to determine feature(s) of object(s) contained in the images. In some of those various implementations, the client device further locally determines if an image shortcut setting is instantiated based on the determined features, and optionally also based on locally determined contextual data (e.g., a current time, a current day of the week, a current location of the client device). Further, the client device can itself locally perform computer actions of the image shortcut setting in response to determining the image shortcut setting is instantiated—or can transmit a query and/or other data to one or more remote devices to cause one or more of the computer actions to be performed (without transmitting the images and/or contextual data). In this manner, the images and/or contextual data can be maintained at the client device, without requiring the images to be transmitted from the client device to cause computer action(s) of an image shortcut setting to be performed—thereby enhancing the security of those images and/or contextual data.

In some implementations, a method implemented by one or more processors is set forth as including steps such as determining, by an assistant application, that a real-time image feed from a camera of a computing device includes a graphical representation of an object. The determination can include processing an image from the camera using one or more image processing techniques. The steps can also include identifying an image shortcut setting associated with the object. The image shortcut setting can correspond to a preconfigured process through which the assistant application responds to image content provided in the real-time image feed. The steps can further include generating a query associated with the image shortcut setting. The query can include a data identifier for a type of data the assistant application provides according to the image shortcut setting. Additionally, the steps can include receiving data based on the query, the data corresponding to the type of data associated with the image shortcut setting. In response to determining that the real-time image feed includes the graphical representation of the object, and based on the image shortcut setting being stored in association with the object, the one or more processors can perform a step of causing the object data to be rendered at the computing device along with the real-time image feed.

The query can further include a context identifier for a context of the real-time image feed from the camera. The context identifier can identify a location at which the real-time image feed is provided by the camera. The image shortcut setting can be preconfigured by a user through a verbal command at least partially processed via the assistant application. The steps can also include transmitting the query to a separate application at the computing device, wherein the data can be received from the separate application. The type of data can correspond to dynamic data that changes independent of the assistant application. The data can be received from a remote device that is responsive to queries from the assistant application.

In other implementations, a system is set forth as including a camera, a display device, a speaker, one or more processors in communication with the camera the display device, and the speaker, and memory configured to store instructions that, when executed by the one or more processors, cause the one or more processors to perform steps that include generating an object identifier based on an image from a real-time image feed provided by the camera. Generating the object identifier can include processing the image using one or more image processing techniques. The steps can also include determining that the object identifier corresponds to an image shortcut setting. The image shortcut setting can cause the provision of data in response to an object appearing in the real-time image feed. The steps can further include transmitting a query to a remote device that is configured to retrieve the data in response to receiving the query, receiving, from the remote device, data associated with the image shortcut setting, and causing the data to be presented via at least one of: the display device and the speaker.

The data can be presented simultaneous to the real-time image feed being displayed at the display device. The steps can further include determining a context identifier for the image from the real-time image feed, wherein the query includes the context identifier. The context identifier can specify a location at which the image was generated by the camera. The system can also include a microphone, and the steps can further include receiving, from the microphone, audio data corresponding to a request from a user to cause the image shortcut setting to be generated. The audio data can be received when a different image is provided by the camera. The steps can also include identifying an object description from the audio data, determining a correspondence between the object description and the different image, and generating the image shortcut setting at least based on the object description.

In yet other implementations, a non-transitory computer-readable medium is set forth as storing instructions that, when executed by one or more processors, cause the one or more processors to perform steps that include receiving audio data corresponding to a request for an assistant application to create an image shortcut setting, and receiving image data from a real-time image feed generated by a camera of a computing device, wherein the assistant application can be accessible to the computing device. The steps can also include identifying, from the audio data, a request for data from the assistant application, and identifying, from the image data, an object identifier corresponding to an object at which the camera of the computing device is directed. The step of identifying the object identifier can include processing the image data using one or more image processing techniques. The steps can further include generating the image shortcut setting based on the request and the object identifier. The image shortcut setting can be configured to cause the assistant application to be responsive to the real-time image feed generated by the camera. Additionally, the steps can include causing, according to the image shortcut setting, the assistant application to provide the data in response to the camera providing different image data associated with the object identifier.

In some implementations, the steps can include identifying, from the different image data, the object at which the camera was previously directed at, and accessing a remote service that provides the data corresponding to the request. The step of identifying the object identifier corresponding to the object can include identifying multiple object identifiers corresponding to multiple different objects at which the camera of the computing device is directed. The image shortcut setting can be further based on the multiple object identifiers. In some implementations, the steps can also include identifying, from the audio data or the image data, a context identifier for the request. The image shortcut setting can be generated further based on the context identifier. The context identifier can identify a time of the request, and the assistant application can provide the data further in response to the camera providing the different image data at the identified time.

In yet other implementations, a method implemented by one or more processors is set forth and includes processing image(s) from a camera of a computing device using one or more image processing techniques, and determining, based on the processing, that the image(s) include one or more features. The method further includes identifying an image shortcut setting associated with the one or more features. The image shortcut setting defines one or more computer actions to be performed in response to determining that the image(s) includes the one or more features. The method further includes performing the one or more computer actions in response to determining that the image(s) include the one or more features, and based on the image shortcut setting being stored in association with the one or more features.

The one or more computer actions can include causing a command to be transmitted to at least one peripheral device, where the command causes a state of the at least one peripheral device to be altered. The one or more computer actions can additionally or alternatively include transmitting a query, receiving data in response to the query, and causing the data to be presented at the computing device and/or at another computing device linked to the computing device. The query can optionally be generated based on the one or more features and/or based on contextual data associated with capture of the image(s). The one or more computer actions can additionally or alternatively include causing an electronic communication (e.g., an email, a text message) to be transmitted to additional computing device(s) of additional user(s). The image(s) can be from a real-time image feed of the camera.

In yet other implementations, a method implemented by one or more processors is set forth and includes receiving audio data corresponding to a request to create an image shortcut setting, and receiving image data from a real-time image feed generated by a camera of a computing device. The method further includes: identifying, from the audio data, one or more computer actions to be performed; and identifying, from the image data, an object identifier corresponding to an object at which the camera of the computing device is directed. Identifying the object identifier includes processing the image data using one or more image processing techniques. The method further includes generating the image shortcut setting based on the request and the object identifier. The image shortcut setting is configured to cause the one or more computer actions to be performed in response to identifying the object identifier from subsequent image data from a subsequent real-time image feed from the camera. The method further includes causing, according to the image shortcut setting, the one or more computer actions to be performed in response to identifying the object identifier from the subsequent image data.

The one or more computer actions can include transmitting a command to at least one peripheral device, where the command causes a state of the at least one peripheral device to be altered. The method can further include: identifying, from the audio data and/or the image data, a context identifier for the request; and generating the image shortcut setting further based on the context identifier. The context identifier can identify at least one time and/or at least one location, and causing, according to the image shortcut setting, the one or more computer actions to be performed can be further in response to the subsequent image data being provided at a time that matches the at least one time and/or or at a location that matches the at least one location.

In addition, some implementations include one or more processors of one or more computing devices, where the one or more processors are operable to execute instructions stored in associated memory, and where the instructions are configured to cause performance one or more methods described herein. The processors may include one or more graphics processing units (GPUs), central processing units (CPUs), and/or tensor processing units (TPUs). Some implementations include one or more non-transitory computer readable storage media storing computer instructions executable by one or more processors to perform one or more methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
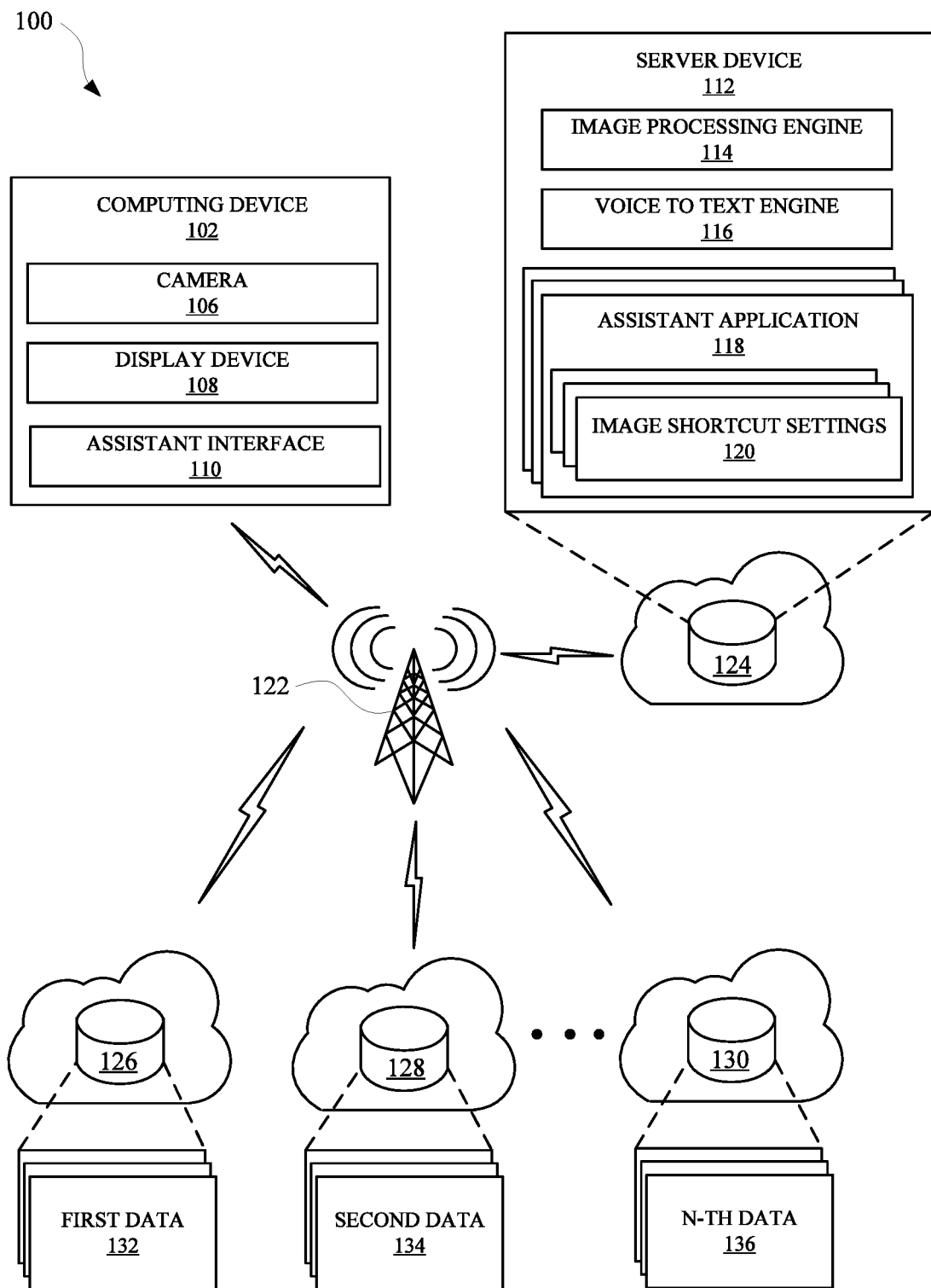
FIG. 1 illustrates a system for providing an automated assistant capable of being responsive to camera images according to image shortcut settings created by a user.

Implementations disclosed herein relate to image shortcut settings that can cause an assistant application to perform one or more functions when a camera of a computing device is directed at one or more objects. For instance, while performing their morning routine, a user may wish to see their agenda, as stored on their portable computing device. Although the user could invoke their automated assistant using a spoken command to see the agenda (e.g., "Assistant, could you please show me my agenda?"), the user can instead configure the automated assistant to automatically provide the agenda when a camera of the portable computing device is directed at an object having one or more particular features. The user can configure this setting using a spoken command such as, for example, "Assistant, when I direct the camera at a mirror in the morning, please display my agenda." In response, the automated assistant can cause the spoken command to be parsed in order to identify text related to a new image shortcut configuration. The new image shortcut configuration can then be generated and stored for use at a later time. For example, the new image shortcut configuration can cause the user's current agenda to be audibly and/or graphically provided to the user via the portable computing device in response to determining: it is currently "the morning"; and that image(s) captured by the camera include a mirror. For instance, the following morning, the user can open a camera application on their portable computing device and direct the camera to their mirror. In response to it being "the morning" and the camera being directed to a mirror, the automated assistant can cause the user's agenda for the day to be presented at the portable computing device and/or at another computing device of the user. For example, the user can direct a camera of a portable watch to their mirror and, in response, the user's agenda can be audibly and/or graphically presented at a smartphone of the user, a smart television of the user, or a stand-alone voice activated speaker of the user.

In some implementations, the user can configure the automated assistant to provide information related to images generated by a camera of a portable computing device. For example, the user can verbally direct the automated assistant to provide weather information when the user directs the camera at the sky (e.g., "Assistant, when I face the camera at the sky, please provide me with weather information."). Thereafter, when the user faces the camera at the sky, the automated assistant can query a weather application or website for weather data, and present the weather data at a display of the portable computing device and/or at a display of another computing device. In some implementations, the automated assistant can use a geolocation of the portable computing device, in combination with an image of the sky, captured by the camera, to provide the weather information. For instance, the automated assistant can generate a query that includes the location and/or object information derived from the image. The query can be provided to a weather application, a weather website, and/or any other source for weather information. The automated assistant can then receive weather information that is specific to the location and/or the image captured by the camera. Weather information specific to the location can include a forecast corresponding to temperature, humidity, precipitation, cloud coverage, and/or any other weather information that can be specific to a location.

In some implementations, an image captured by the camera can be processed at the computing device or a remote device that provides a service to identify objects within the image in order that the information provided by the automated assistant can be based on the identified objects. For instance, when the user has configured the automated assistant to provide weather information when the user directs the camera at the sky, objects in the sky can be identified and used as a basis for providing the weather information. Such objects can include clouds, or an absence of clouds. If there is an absence of clouds, the automated assistant can provide the weather information without details regarding cloud coverage, at least based on the assumption that the user can infer the state of the cloud coverage.

In some implementations, the user can configure the automated assistant to be responsive to images from the camera, while also considering a time and/or a location of when the images are being captured, and/or any other contextual data. For example, a user can indicate to the automated assistant that they would like transit information when they are directing their camera at a train station (e.g., "Assistant, could you please provide transit information when I direct the camera at a train station?"). In response, when the user subsequently directs the camera at a train or a train station, the automated assistant can provide transit information. The transit information can be based on a time, day of the week, and/or particular date at which the camera is capturing an image of the train or train station, a current location of the portable computing device, stored personal information of the user (e.g., a calendar of the user, a home or work address of the user), and/or any other contextual data. For example, if the image is captured in the morning on a weekday, the automated assistant can determine transit information from the current location of the portable computing device to a work address of the user. For instance, the automated assistant can generate and submit a query that seeks public transport directions from the current location to the work location. Transit information can be received in response to the query, and provided for presentation to the user at the portable computing device. If, on the other hand, the time at which the user is capturing the image is in the evening, the automated assistant can retrieve and provide transit information pertinent to travel to the user's home. As yet another example, if a user's calendar indicates an upcoming appointment at a particular location, the automated assistant can retrieve and provide transit information pertinent to travel to the particular location. In other implementations, the automated assistant can be configured by the user to provide media to read, watch, or listen to (e.g., articles, podcasts, etc.) when the user directs their camera at a train or train station in the evening (e.g., "Assistant, could you please provide me with a podcast when I point the camera at a train during a work night"). In these and other manners, the user does not necessarily have to provide verbal or textual commands in order to invoke the automated assistant to provide information to the user.

In some implementations, the user can configure the automated assistant to provide information that is stored on their device or otherwise accessible through their device in response to the user directing their camera at a particular object. For instance, a user can store a bike lock code in the notes of their portable computing device. When the user is directing the camera of the portable computing device at the bike lock, the user can direct the automated assistant to create an image shortcut to the bike lock code. In other words, the user can invoke the automated assistant with a command, such as, "Assistant, when I direct the camera at my bike lock, please provide me with the bike lock code in my notes." Thereafter, when the user directs the camera at the bike lock, the automated assistant can cause the bike lock code to be presented, or can cause a notes application that includes the bike lock code to be opened in a state that presents the bike lock code to the user. The bike lock code can optionally be presented simultaneous to a camera application providing a real-time image feed of the bike lock, at which the camera is directed.

In other implementations, the automated assistant can be configured to provide information from remote devices when a camera of a portable computing device is directed at a particular object. For instance, the user can configure the automated assistant to provide a security code for a vacation home when the user directs a camera of the portable computing device at a door of the vacation home. The automated assistant can be configured this way in response to a command such as, for example, "Assistant, please provide the security code to this door when I direct the camera at the door." The information provided by the automated assistant (e.g., the security code) can be based on the image captured by the camera, the location of the portable computing device, and/or the data from the remote device. For example, the security code can be extracted from an email sent to the user and stored at an email server accessible to the portable computing device. The automated assistant can provide a query to the email server (or related server) in order to retrieve the security code. The query can optionally include an identifier of the location at which the image was taken, in order to identify the security code from a plurality of candidate security codes extracted from other emails of the user (e.g., security codes that may correspond to other locations). When the automated assistant has retrieved the security code, the security code can be presented at a display of the portable computing device while the user is directing the camera at the door of the vacation home. Alternatively, the automated assistant can provide the security code through a different medium (e.g., through a text message, an audio announcement, etc.). For instance, the automated assistant can convert the security code into audio that is then projected by a speaker of the portable computing device (e.g., "Assistant, when I point the camera at this door, could you please tell me the security code for the door?"). Thereafter, when the user directs the camera at the door, the automated assistant can audibly provide the security code (e.g., "The security code from your email is 2, 7, 1, 8, 2.").

Turning now to the figures, FIG. 1 illustrates a system 100 for providing an automated assistant capable of being responsive to camera images according to image shortcut settings created by a user. The automated assistant can operate as part of an assistant application 118 that is provided at a computing device 102 or a remote device 124, such as a server device 112. A user can interact with the automated assistant via an assistant interface 110, which can be a microphone, a camera, a touch screen display, a user interface, and/or any other apparatus capable of providing an interface between a user and an application. For instance, a user can initialize the automated assistant by providing a verbal, textual, or a graphical input to the assistant interface 110 to cause the automated assistant to perform a function (e.g., provide data, control a peripheral device, access an agent, etc.). The computing device 102 can include a camera 106 for capturing images and/or videos of objects at which the camera 106 can be directed. The camera 106 can generate image data while being directed at an object, and the image data can be displayed at a display device 108 of the computing device 102. In this way, the computing device 102 can provide, at the display device 108, a real-time image feed of what the camera 106 is being directed at. The display device 108 can be a display panel that includes a touch interface for receiving touch inputs and/or gestures for allowing a user to control applications of the computing device 102 via the touch interface.

Although a single computing device 102 is illustrated in FIG. 1, in various implementations multiple computing devices can interface with the assistant application 118 in performing various techniques disclosed herein. For example, an image shortcut can be triggered based on image(s) captured via camera 106 of computing device 102, and responsive data for the image shortcut can be audibly and/or graphically presented at a separate computing device in response to triggering of the image shortcut. The separate computing device can be linked to the computing device 102. For example, the separate computing device can be linked to the computing device 102 based on the same user account being utilized at both computing device, based on both computing devices being connected to the same secured network, based on both computing devices being in direct peer-to-peer communication with one another, etc. As another example, an image shortcut can be triggered based on image(s) captured via camera 106 of computing device 102, and the triggered image shortcut can cause the assistant application 118 to transmit command(s) that cause the state of one or more peripheral devices (e.g., IoT devices) to be altered. For instance, a command can be transmitted to a networked "smart" light that causes the light to turn on or off, alter its lumen output, alter its light output color, etc. Also, for instance, a command can additionally or alternatively be transmitted to a networked "smart" thermostat that causes it to alter a set temperature of a heating or cooling system, turn a heating or cooling system on or off, etc. Also, for instance, a command can additionally or alternatively be transmitted to a networked "smart" garage door opener that causes a garage door to open or close.

The computing device 102 can be in communication with the remote device 124 over a network 122, such as the internet. The computing device 102 can offload computational tasks to the server device 112 in order to conserve computational resources at the computing device 102. For instance, the server device 112 can host the assistant application 118 and the computing device 102 can transmit inputs received at the assistant interface 110 to the server device 112. However, in some implementations, the assistant application 118 can be hosted at the computing device 102. In various implementations, all or aspects of the assistant application 118 can be implemented on the computing device 102. In some of those implementations, aspects of the assistant application 118 are implemented via a local assistant application of the computing device 102 and interface with the server device 112 that implements other aspects of the assistant. The server device 112 can optionally serve a plurality of users and their associated assistant applications via multiple threads. In implementations where all or aspects of the assistant application 118 are implemented via local assistant application of the computing device 102, the local assistant application can be an application that is separate from an operating system of the computing device 102 (e.g., installed "on top" of the operating system)—or can alternatively be implemented directly by the operating system of the computing device 102 (e.g., considered an application of, but integral with, the operating system).

The server device 112 can include other applications and/or scripts for processing data provided by the computing device 102. For example, the server device 112 can include an image processing engine 114 capable of processing images from the camera 106 of the computing device 102 and providing object identifiers corresponding to objects in the images. The image processing engine 114 can employ one or more algorithms, such as a computer vision algorithm, for processing the images from the camera 106. The computer vision algorithm can correspond to a pixel grouping or a pixel classification algorithm capable of segmenting pixels of an image, and designating the segments of pixels as objects. The image processing engine 114 and/or the assistant application 118 can generate different object identifiers from an image using one or more techniques that can classify an image on a pixel-by-pixel basis, or a pixel group-by-pixel group basis. For example, each N×N group of pixels of the image can be associated with one or more corresponding object identifiers (and optionally corresponding probabilities for each of multiple object identifiers). For instance, a group of pixels that correspond to a tire of a bike can be associated most strongly with a "tire" object classification, whereas groups of pixels that correspond to other portions of the bike are associated most strongly with a "bike" classification. Additional and/or alternative image processing techniques can be utilized to generate the object identifiers.

In some implementations, the image processing engine 114 can include an image search engine that uses images as search queries to an internet search engine in order to identify objects in the image. Alternatively, image processing engine 114 can employ one or more machine learning models for identifying objects within the images provided by the computing device 102. Object identifiers corresponding to the objects in the images can be generated by the image processing engine 114 and/or the assistant application 118 in response to the image processing engine 114 processing the images. The assistant application 118 can use the object identifiers when generating image shortcut settings 120.

The image shortcut settings 120 can be preconfigured with the assistant application 118, or be setup at least through a user interaction with the assistant application 118. An image shortcut setting 120 can be an application setting that causes the assistant application 118 to provide data or otherwise perform an action in response to the user directing the camera 106 at a specific object. The image shortcut setting 120 can be setup by user through a combination of voice commands and image data provided by the camera 106. For instance, a user can initialize the creation of an image shortcut setting 120 by providing a verbal command to the assistant interface 110 at the computing device 102 (e.g., "Assistant, could you please provide my shopping list when I point my camera at the refrigerator?"). While providing the verbal command, the user can be directing the camera 106 at an object to cause the assistant application 118 to receive an image of the object. The image can be processed by the image processing engine 114, and the image processing engine 114 can provide the assistant application 118 with an object identifier corresponding to the object. Furthermore, the verbal command can be captured as audio data at the computing device 102 and transmitted to a voice to text engine 116 at the server device 112.

The voice to text engine 116 can process the audio data to identify the text embodied in the audio data. The process for converting the audio data to text can include a speech recognition algorithm, which can employ neural networks and/or statistical models for identifying groups of audio data corresponding to words or phrases. The text converted from the audio data can be available to the assistant application 118 as textual data that can be used to generate image shortcut settings 120, depending on the contents of the textual data. For instance, when the textual data includes a conditional statement that identifies the camera or an image, and an action to be performed by the assistant application 118, the assistant application 118 can generate an image shortcut setting 120 based on the textual data. Furthermore, the object identifier generated from the image provided by the camera can also be stored in association with the image shortcut setting 120. In this way, the assistant application 118 can have a reference with which to compare to future images that are provided by the camera.

For example, the phrase "Assistant, please provide my shopping list when I point my camera at the refrigerator," can be processed into text by the voice to text engine 116 and the text can be parsed by the assistant application 118. The assistant application 118 can identify that the user wishes to create an image shortcut setting 120 from the command "provide my shopping list," as well as identify the object descriptor "refrigerator," and the device identifier "camera." If the user is directing the camera at the refrigerator, one or more images of the refrigerator can be processed by the image processing engine 114 in order to generate an object identifier (e.g., "refrigerator"). The image(s) and/or the object identifier can be stored in association with the image shortcut setting 120 so that the command (e.g., "provide my shopping list") can be executed by the assistant application 118 the next time the user directs the camera at the refrigerator.

In some implementations, the server device 112 can include one or more machine learning models that are trained with images previously captured by the camera 106, in order to expedite the process of identifying the objects in the images. Furthermore, the assistant application 118 can access a purchase history of the user in order to more readily identify objects in the images from the camera 106. For instance, the assistant application 118 can access a first remote device 126 that hosts a shopping application where the user purchased their refrigerator and first data 132 that identifies the refrigerator. The first data 132 can include images of the refrigerator, thereby allowing the assistant application 118 to compare an image from the camera 106 to the images from the first data 132. This allows the assistant application 118 to confirm that the text in the verbal command for creating the image shortcut setting 120 actually corresponds to the object in the image (e.g., the refrigerator).

In other implementations, contextual data in combination with the image data from the camera and the text data from the spoken command of the user can be used to generate an image shortcut setting. For instance, when the user provides the command "Assistant, please provide my shopping list when I direct my camera at the refrigerator," a geolocation of the user or the computing device can be acknowledged by the assistant application 118. The assistant application 118 can determine that the geolocation corresponds to the home of the user, and therefore determine that the refrigerator in the image is owned by the user. This avoids situations when the user is directing the camera at a different refrigerator and the assistant application 118 provides the shopping list. Instead, the assistant application 118 can receive the image data (e.g., an image of the refrigerator) with the geolocation and confirm the geolocation corresponds to the residence of the user before providing the shopping list, or otherwise fulfilling a request associated with the image shortcut setting 120.

In yet other implementations, an image shortcut setting 120 can be setup to cause the assistant application 118 to provide data stored at a separate device than the computing device 102. For instance, the aforementioned shopping list that the user is requesting in response to directing the camera 106 at the refrigerator can be stored at a second remote device 128 that includes second data 134 and/or an Nth remote device 130 that includes N-th data 136. Therefore, according to the image shortcut settings 120, the assistant application 118 can query a different remote device (e.g., the first remote device 126) than the computing device 102 or the server device 112 in order to obtain the shopping list. In some instances, the shopping list can be managed by a website or an application hosted at the first remote device 126. Alternatively, the image shortcut setting 120 can include a request for dynamic data (e.g., weather data, news, etc.) that can change regularly. Therefore, the assistant application 118 can query one or more remote devices (e.g., news website servers) to receive the dynamic data in response to a user directing their camera 106 at an object associated with a preconfigured image shortcut setting 120.

Figure 2A:
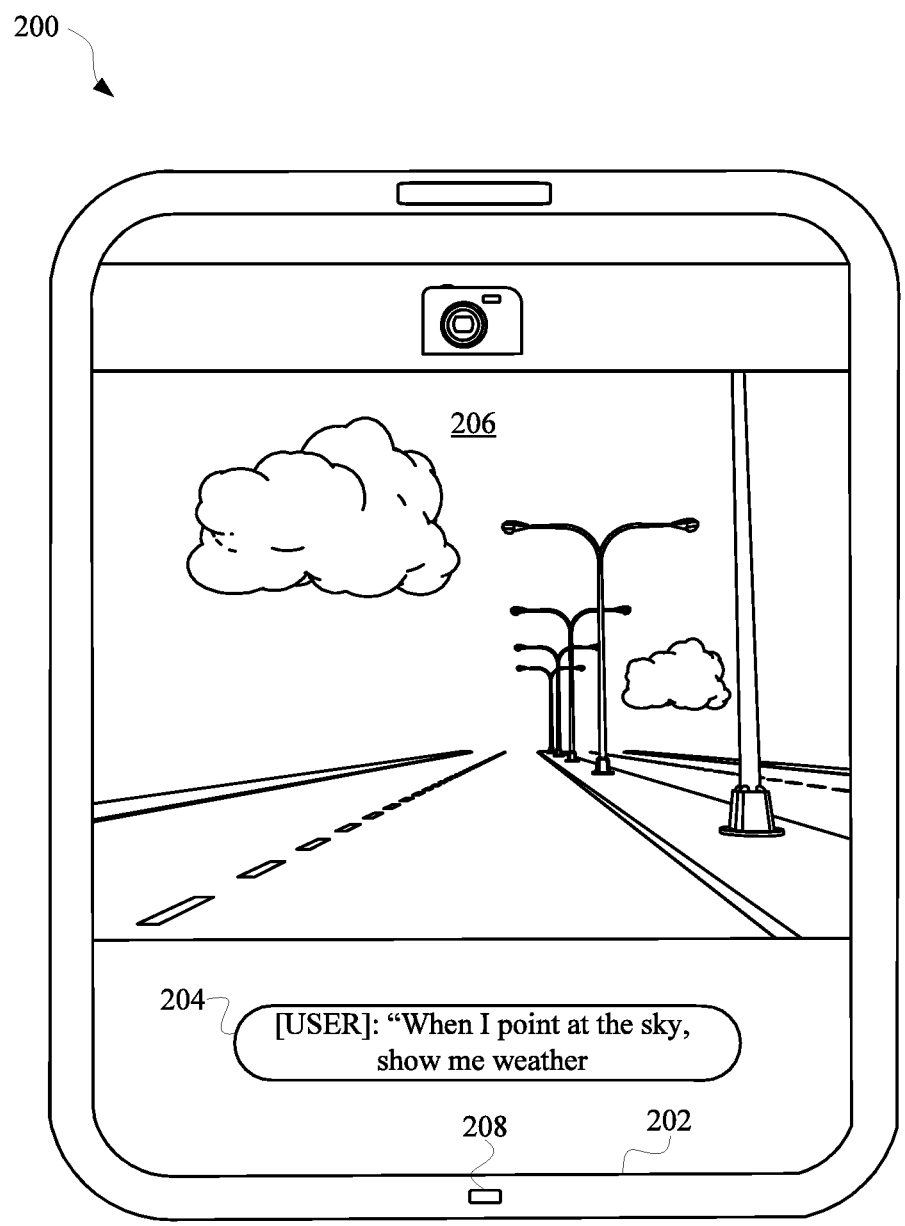
FIG. 2A illustrates a view of a computing device operating an assistant application capable of generating an image shortcut setting according to instructions from a user.

FIG. 2A illustrates a view 200 of a computing device 202 operating an assistant application capable of generating an image shortcut setting according to instructions from a user. Specifically, FIG. 2A illustrates the computing device 202 being used to setup an image shortcut setting while the user is directing a camera of the computing device 202 toward an object (e.g., the sky) that is the subject of the image shortcut setting. In order to setup the image shortcut setting, the user can direct the camera (e.g., on the back of the computing device 202 facing away from an interface 206) at the sky and provide a verbal command to a microphone 208 of the computing device 202. The verbal command can specify the conditions for an image shortcut setting such as, for example, the camera being directed at the sky as described by the input text 204 ("When I point at the sky, show me the weather"). The verbal command can be captured as audio data and processed at the computing device 202 or a remote device for converting the audio data into text. The text of the command can thereafter be processed or parsed in order to determine how to respond to the command.

The assistant application accessible to the computing device 202 can process the text in order to determine the actions to take in response to receiving the audio data. For instance, the terms "when I point" can be a condition, the term "show me weather" can be an action, and the term "sky" can be an object that is the subject of the condition. The assistant application can also use one or more images from the camera of the computing device 202 in order to generate the image shortcut setting. For instance, as illustrated in FIG. 2A, the user can be directing the camera of the computing device 202 at the sky while providing the verbal command for initializing the creation of the image shortcut setting. An image from the camera can be processed by the computing device 202 or a separate device for identifying the objects in the image. When an object in the image is also identified by text in the verbal command, the object can be considered essential to the image shortcut setting. For instance, the sky graphically represented in the interface 206 can also be identified in the input text 204. This correspondence between the image and the verbal command can be embodied in an index that is managed by the assistant application and stored in association with the image shortcut setting.

In some implementations, the generation of the image shortcut setting can based on sensor data received from one or more sensors of the computing device 202. For instance, the sensor data can be provided from a camera, a gyro sensor, an accelerometer, a touch sensor, an audio sensor, an infrared sensor, a temperature sensor, a heart rate monitor, a chemical sensor, a capacitive sensor, and/or any other sensor. For instance, the assistant application can store a condition that requires the gyro sensor to be directed at or above a horizon in order to at least partially fulfill the image shortcut setting for providing the weather. Alternatively, the image shortcut setting can be stored as a variable condition setting that provides weather for different locations depending on a geolocation of the user or the computing device 202. For instance, a function corresponding to the image shortcut setting can include slots for the object identifier (e.g., "sky"), the location (e.g., coordinates from a GPS transmitter, or location data gathered from other applications such as a calendar application), and/or a time of day (e.g., 9:00 AM EST). In this way, weather data provided in response to the user invoking the image shortcut setting can be different depending on the object, the location, and/or the time day that the image shortcut setting is invoked. For example, the user can direct the camera at the sky in the morning (e.g., time of day=9:00 AM EST) in order to get the weather for the rest of the day, or direct the camera at the sky at night (e.g., time of day=10:00 PM EST) in order to get the weather for the following day.

Figure 2B:
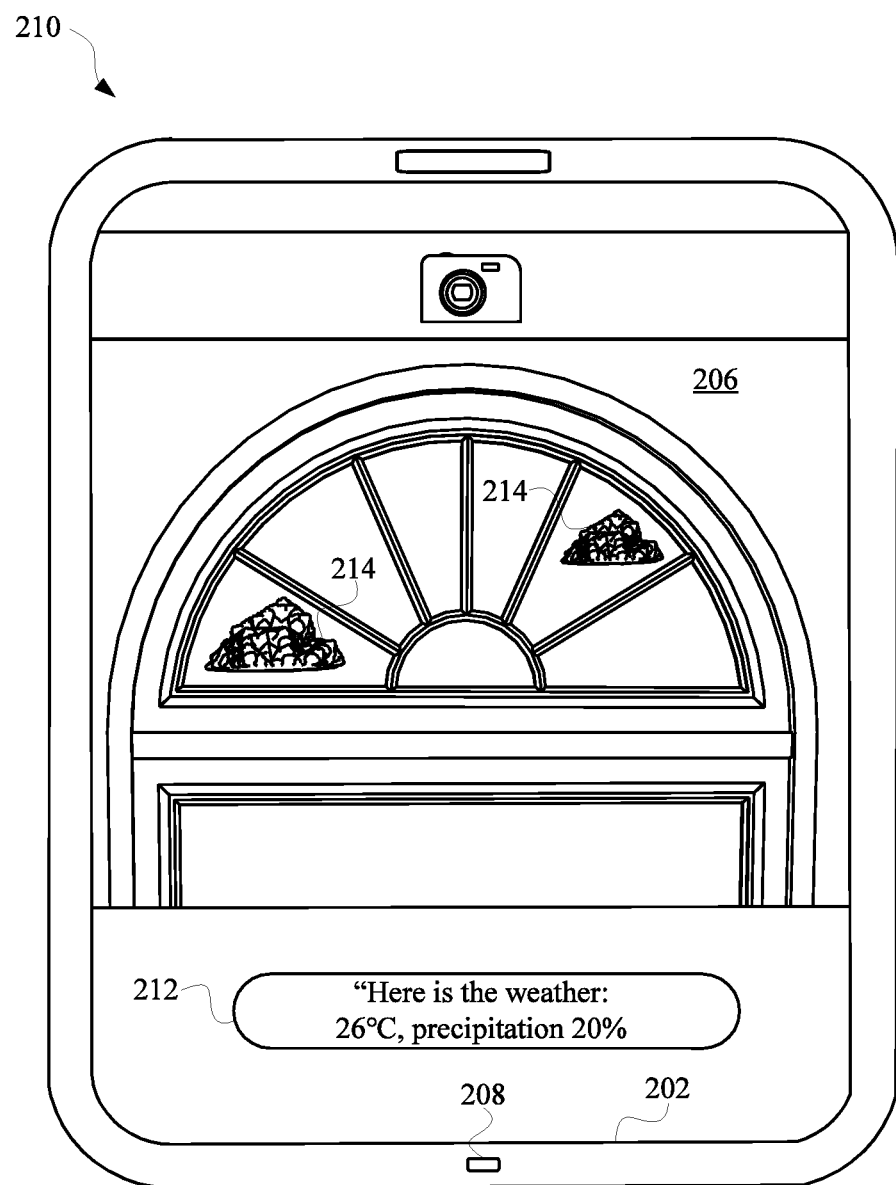
FIG. 2B illustrates a view of the computing device providing a response to a user initializing an image shortcut setting by directing the camera of the computing device at an object associated with the image shortcut setting.

FIG. 2B illustrates a view 200 of the computing device 202 providing a response to a user initializing an image shortcut setting by directing the camera of the computing device 202 at an object associated with the image shortcut setting. Specifically, the user can initialize an action to be performed according to the image shortcut setting by directing their camera at an object, such as the sky. The camera can provide a real-time image feed, which can be presented at the interface 206 of the computing device 202. When the real-time image feed includes the sky, the assistant application can cause the interface 206 to provide data or perform some action in response to the camera being directed at the sky. For instance, the image presented at the interface 206 can include some amount of the sky (e.g., clouds 214) thereby triggering the automated assistant to perform the action of providing weather data according to the image shortcut setting.

In some implementations, the image from the real-time image feed provided at the interface 206 can be sampled and provided to a trained machine learning model capable of providing object identifiers (e.g., "sky") in response to receiving the sampled image. The assistant application can thereafter use the object identifier to determine whether an action is to be performed according to an image shortcut setting. Alternatively, the sampled image can be provided to an image search database that is capable of comparing the sampled image to other stored images in order to identify identifiers for objects in the image. Should one or more objects correspond to one or more image shortcut settings, one or more actions can be performed according to the corresponding image shortcut settings.

In some implementations, context data or a context identifier can be inferred from the sampled image and used to determine whether conditions of an image shortcut setting have been satisfied. For instance, a user can direct the automated assistant to create an image shortcut setting with a condition that can be inferred from a camera image (e.g., "Assistant, when I point the camera at the sky in the morning, please send my wife a text that says 'Good morning!'"). Subsequently, the user can be directing the camera at a morning sky (i.e., the sun breaching the horizon), which can be processed by the assistant application, the computing device 202, or a remote device to determine that the image was captured in the morning. If the user is in fact directing their camera at the sky in the morning, the action corresponding to the image shortcut setting can be performed (e.g., a text message saying "Good morning!" can be sent to the contact labeled "wife"). Alternatively, the time associated with the image can be inferred from a clock at the computing device 202 or a remote device. In some instances, the user can request that the text message be sent when the user is traveling and the camera is being directed at the sky in the morning. In this way, the image of the sky, along with a time and a location of the image can be conditions in which the text message would be sent from the computing device 202.

Figure 3A:
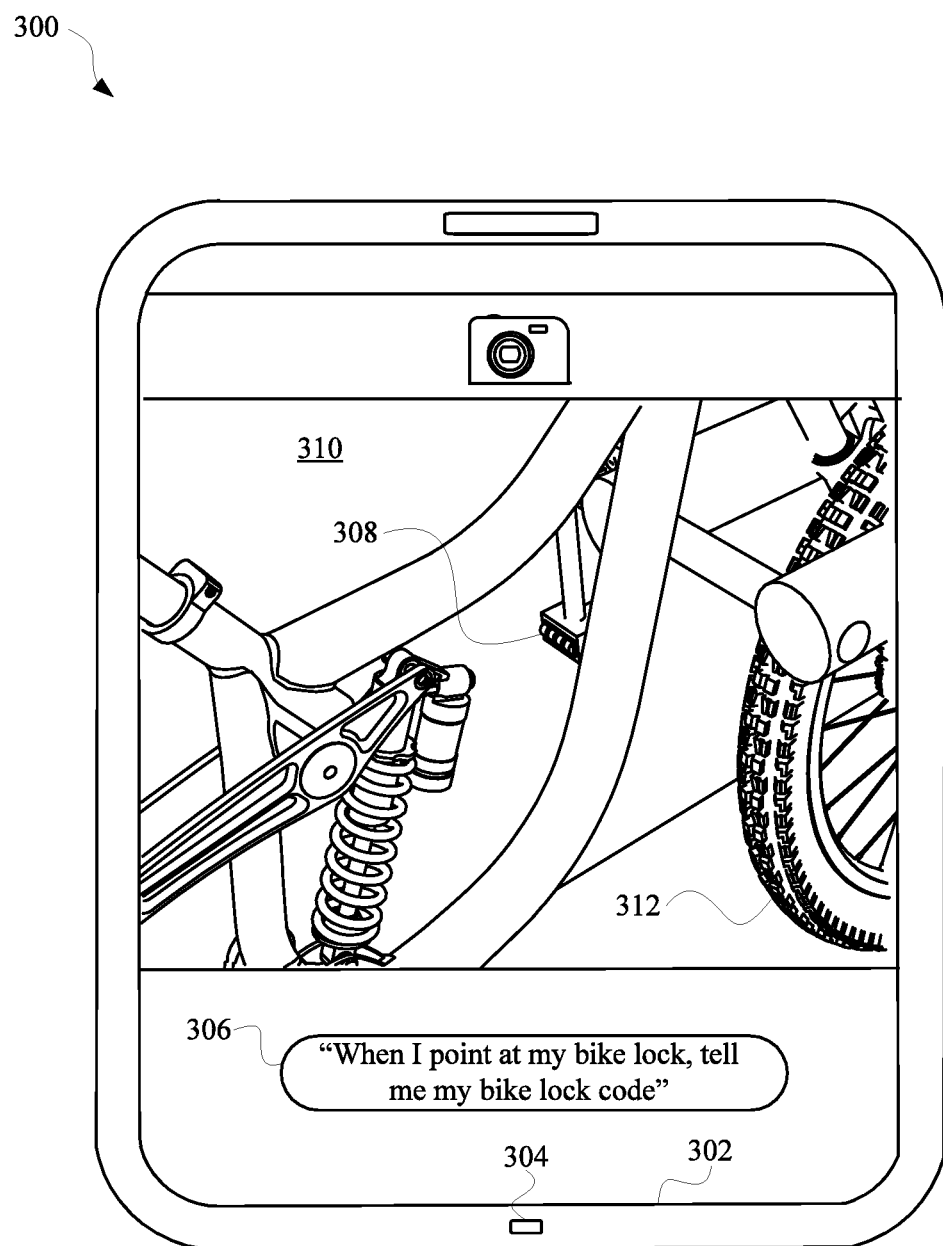
FIG. 3A illustrates a view of a computing device that is being used to configure an image shortcut setting for an assistant application.

FIG. 3A illustrates a view 300 of a computing device 302 that is being used to configure an image shortcut setting for an assistant application. Specifically, the image shortcut setting allows a user to receive data stored at their computing device 302 or otherwise accessible to their computing device 302 in response to directing their camera at one or more objects. Initially, a user can provide a verbal command (e.g., via a microphone 304 of the computing device 302) or textual command (e.g., using a keyboard of the computing device 302). The command can provide the object, conditions, and/or the action for the image shortcut setting. For instance, as provided in the user input 306 (i.e., a verbal command that is transcribed by the assistant application), the user can request the assistant application provide a code for a bike lock that the user attaches to their bike to secure the bike at a particular location. The text from the command can be parsed by the assistant application in order to generate the image shortcut setting that is managed by the assistant application. For instance, the text can be parsed in order to identify data to input to slots of a function for generating the image shortcut setting. The data to be input into the function can include "when I point," "bike lock," and "code." Furthermore, the function can include a condition that the user must be using a camera application or otherwise directing the camera in a way that satisfies a condition of the function. Thereafter, when the user directs their camera at the bike lock 308, the assistant application can cause the bike lock code to appear at the interface 310, or audibly announce the bike lock code.

In some implementations, the image that is the initial subject for the image shortcut setting can be processed to identify multiple objects within the image that can be used to trigger an action by the assistant application. For instance, although the user has suggested that the assistant application provide the bike lock code when the camera is directed at the bike lock, the image at the interface 310 can be processed to identify other objects besides the bike lock 308. Additional objects can include a bike tire 312, which, when identified, can provide contextual data that can provide further basis for the assistant application to take action. For instance, a user may not be interested in seeing their bike lock code unless the bike lock is attached to the bike. The image shortcut setting can therefore be generated to only provide the bike lock code when the camera is directed at the bike lock and the bike tire 312, thereby avoiding situations when the camera is otherwise directing the camera at the bike lock 308. For example, the user can direct the camera at a book shelf to get information about one of their books, and the bike lock can be lying on the book shelf. However, because the bike tire 312 does not appear in the camera's field of view while being directed at the book shelf, the assistant application can omit providing the bike code and otherwise provide information about the book.

In some implementations, a user can tap on the portion of the image or draw a line around the portion of the image that they intend to be the conditional object of the image shortcut setting. For instance, a user can direct their camera at an object, such as the bike lock 308, and a real-time image feed or an image of the bike lock 308 can be processed at the computing device or a remote device to identify objects within the image. The computing device can also identify areas in the real-time image feed or the image where the object (e.g., the bike lock 308) is and, if the user taps a touch display of the computing device within the area, or draws a shape around the object, the object can be designated as the subject of an image shortcut setting.

In some implementations, the computing device 302 can be a wearable device that can be worn at the head of a user similar to eye glasses or other wearable accessories. The wearable device can include a display device that can extend over an eye of the user, and a camera that can be directed in substantially the same direction as, or share a viewing area with the eye of the user. For instance, when the user is wearing the wearable device (i.e., the computing device 302), the user can cause the camera to capture an image of the bike lock 308. Simultaneously, the user can use their finger to point at the bike lock 308 and recite a command to the automated assistant through the wearable device. For instance, the user can provide the command, "Assistant, when I point to the bike lock, please provide the bike lock code 2-7-1-8." Subsequently, when the user is wearing the wearable device and points to their bike lock 308 with their finger, the automated assistant can audibly provide the bike lock code through the wearable device or cause the bike lock code to be presented at the display of the wearable device. Similarly, the user can use their eye movement while wearing the wearable device in order to create an image shortcut setting. For instance, the user can direct their eyes at the bike lock 308 and command the automated assistant to create an image shortcut setting regarding the eye direction and the bike lock 308. The command can be, for example, "Assistant, when I am looking at the bike lock, provide me the bike code 2-7-1-8." Subsequently, when the user is wearing the wearable device and looking at the bike lock 308, the automated assistant can cause the wearable device to audibly or visually present the bike lock code.

Figure 3B:
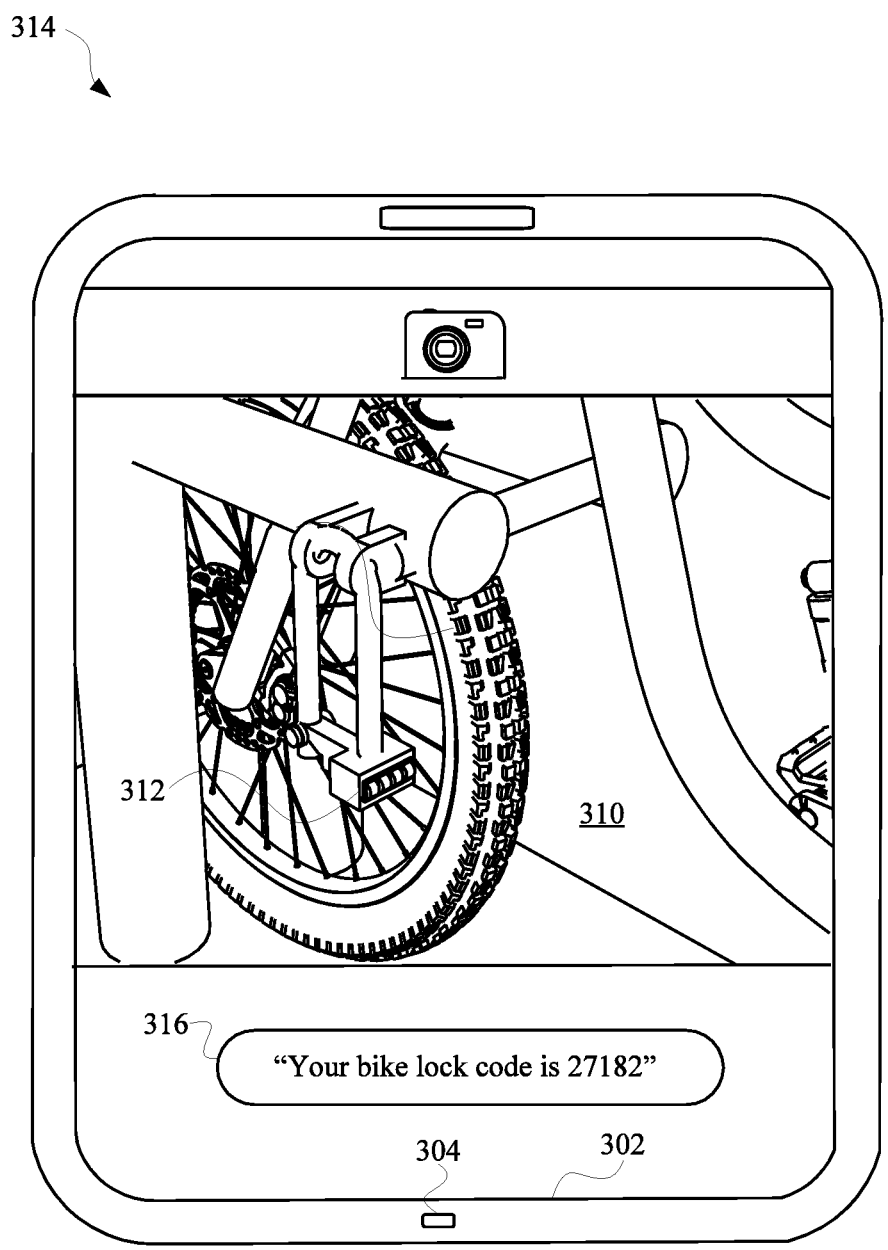
FIG. 3B illustrates a view of a computing device operating an assistant application according to an image shortcut setting.

FIG. 3B illustrates a view 314 of a computing device 302 operating an assistant application according to an image shortcut setting. Specifically, the view 314 shows how the assistant application can provide an output 316 in response to a camera of the computing device 302 being directed at an object (e.g., the bike lock 308). For instance, after creating the image shortcut setting via the assistant application, the user can approach the bike and direct the camera of the computing device 302 at the bike lock 308. The assistant application and/or the computing device 302 can process an image of the bike lock 308 as captured by the camera to determine that the bike lock 308 is in the field of view of the camera. In response, the assistant application can present data (e.g., the bike lock code) or perform some other action for the user.

In some implementations, the process of executing the action (e.g., providing data) associated with the image shortcut setting can be performed without the computing device 302 providing the real-time image feed at the interface 310. Rather, the user can approach the object without the interface 310 displaying the real-time image feed, or without the interface being active, and still cause the action to be performed. For instance, the user can be operating a messaging application that is displayed over the entire interface 310 and simultaneously direct the camera at the object. In response, the assistant application can acknowledge the object being in the field of view of the camera and perform the action associated with the object that is the subject of the image shortcut setting (e.g., present the bike lock code over top of the messaging application interface).

In other implementations, an action associated with an image shortcut setting can be performed when the computing device 302 is locked or when the computing device 302 is otherwise capable of operating opposite facing cameras. For instance, the computing device 302 can include a front facing camera (i.e., a camera that faces in the same direction as the interface 310) and a rear facing camera (i.e., a camera that faces away from the interface). An image shortcut setting can be accessible to the assistant application for providing data when a first object is present in a field of view of the front facing camera and a second object is present in a field of the rear facing camera. Furthermore, the image shortcut setting can be setup by an owner of the computing device 302, or a non-owner of the computing device 302. For instance, a person that hosts visitors at their home through an online service can create image shortcut settings for an assistant application. An image shortcut setting setup by a host can require their visitors to show their face at the front facing camera of the visitor's computing device while simultaneously directing their rear facing camera at the host's home in order to access their home. An image of a visitor's face can be uploaded by the visitor to a host's website, or a site associated with the host, and an image from the front facing camera of the visitor's computing device can be compared to the uploaded image. If website, or other device, determines that the front facing camera image corresponds to the uploaded image, the assistant application can further determine whether the rear facing camera is being simultaneously directed at a lock of the home. If so, the server hosting the website can provide an access code to the visitor's device or the assistant application. In some implementations, the image shortcut setting can also require that the visitor's geolocation be confirmed (e.g., confirm that the visitor is at the home) before receiving the access code.

Figure 4A:
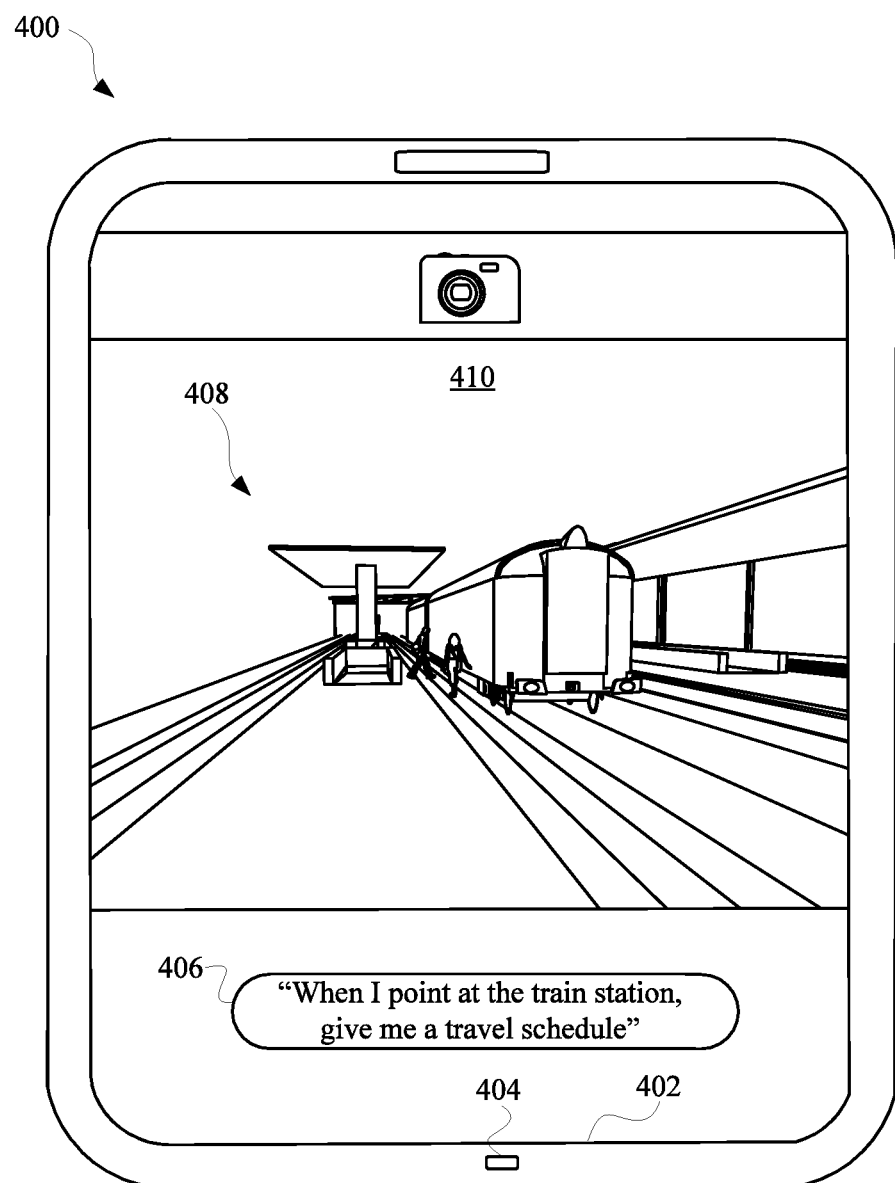
FIG. 4A illustrates a view of a computing device being used to arrange an image shortcut setting that can cause an assistant application to provide data or perform an action at least based on contextual data received by the assistant application.

FIG. 4A illustrates a view 400 of a computing device 402 being used to arrange an image shortcut setting that can cause an assistant application to provide data or perform an action at least based on contextual data received by the assistant application. For instance, a user can initialize the creation of an image shortcut setting by providing a verbal command to the assistant application (e.g., "When I point at the train station, give me a travel schedule."). The verbal command can be received at a microphone 404 of the computing device 402 and converted into a textual input 406 at the computing device 402 or a remote device. The textual input 406 can be parsed by the assistant application to identify the object (e.g., the train station) that is the subject of the image shortcut setting and the data (e.g., the travel schedule) to be provided in response to the object be presented in the field of view of the camera of the computing device 402.

The data provided by the assistant application can change depending on the time of day that the user is invoking the assistant application via the image shortcut setting. For instance, a destination can be inferred by the assistant application from a calendar application, historical travel data, and/or any other source of data that can include location data. The inferred destination can depend on a time a day at which the user is directing the camera at a train station 408. For instance, the assistant application can identify a train schedule corresponding to the train station 408 where the user is located when providing the verbal command for creating the image shortcut setting. Because the train schedule is dynamic data that changes according to time, the assistant application can store the image shortcut setting in association with a function that has a slot for time, as well as, at least, an object identifier (e.g., "train station").

In this way, when the user is directing the camera at the train station 408, the assistant application can, in response, retrieve the time of day and the train schedule. In some implementations, the assistant application can also retrieve destination information from a variety of sources in response to the user directing the camera at the train station 408. The destination information can be used by the assistant application to provide an estimated time at which the user will arrive at their predicted destination according to the available train schedule associated with the train station 408.

Figure 4B:
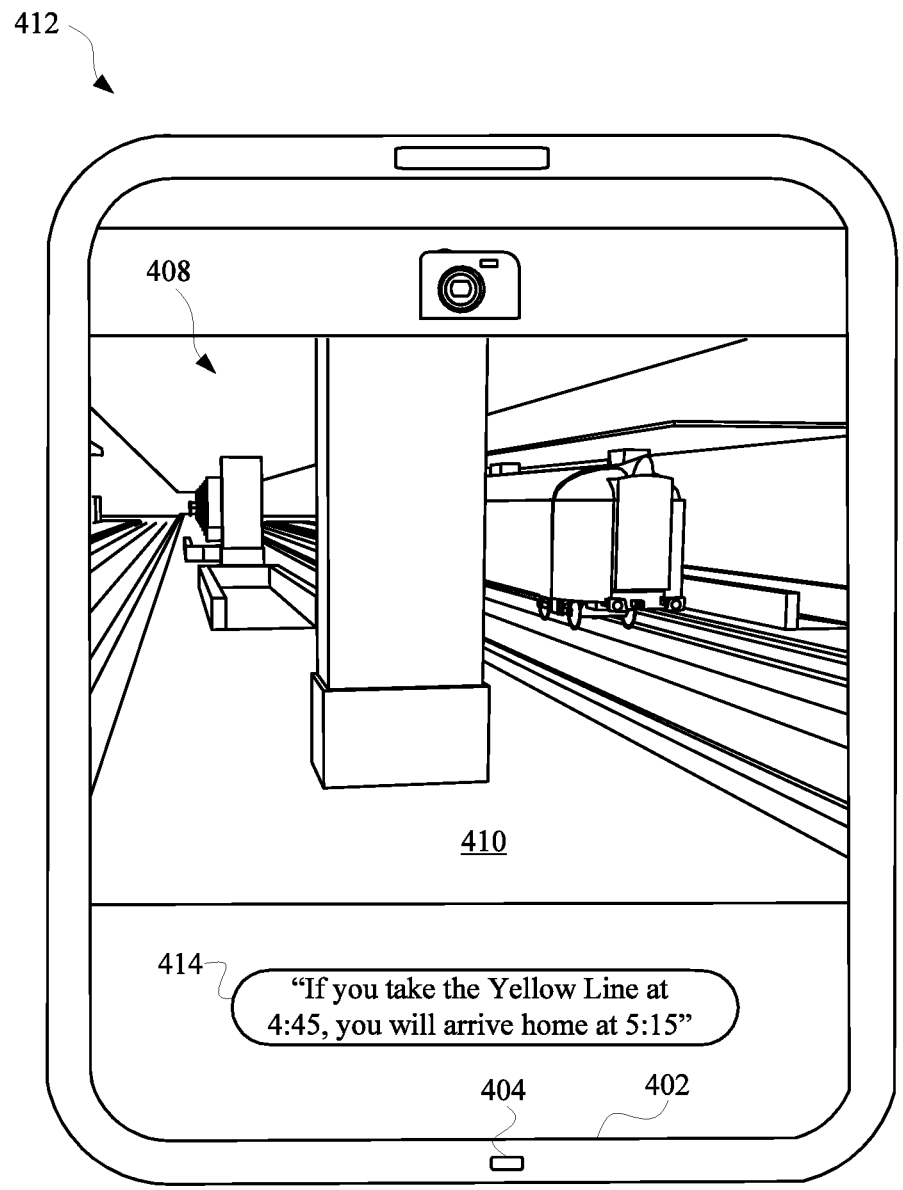
FIG. 4B illustrates a view of a user directing the camera of a computing device at the train station in order to cause the assistant application to perform an action according to the previously generated image shortcut setting.

FIG. 4B illustrates a view 412 of a user directing the camera of a computing device 402 at the train station 408 in order to cause the assistant application to perform an action according to the previously generated image shortcut setting. The image of the train station 408 provided at an interface 410 of the computing device 402 can be processed at the computing device 402 or a remote device in order to determine that the image contains a train station. The assistant application can then receive an object identifier that identifies the train station in the image and, optionally, the assistant application can determine a location of the train station 408 and/or a time of day that the image was captured. The location of the train station 408 can be used to determine where the train station 408 is, so that the appropriate train schedule can be retrieved. Furthermore, the time of day can be retrieve to identify trains that will be arriving at the train station 408 and thereafter traveling toward the destination of the user.

If the assistant application is able to gather the data related the location of the user, the travel schedule for trains moving through the train station 408, and the time of the day the user captured the image of the train station 408, the assistant application can generate an output 414 for the user. Specifically, the output 414 can include a suggestion for a route to take from the train station to the destination of the user. For instance, the assistant application can determine that the user was at work and is now at the train station 408, therefore the user is likely heading home (unless their calendar indicates otherwise). The assistant application can then identify a train (e.g., the "Yellow Line") that goes to their home, and provide an estimate of when the user will arrive home if they take the upcoming train (e.g., "If you take the Yellow Line at computing devices 4:45, you will arrive home at 5:15"). In this way, the user does not have to provide a verbal command to the assistant application but rather, can simply aim their camera at the train station in order to receive instructions regarding the best route to get home at a particular time.

Figure 5A:
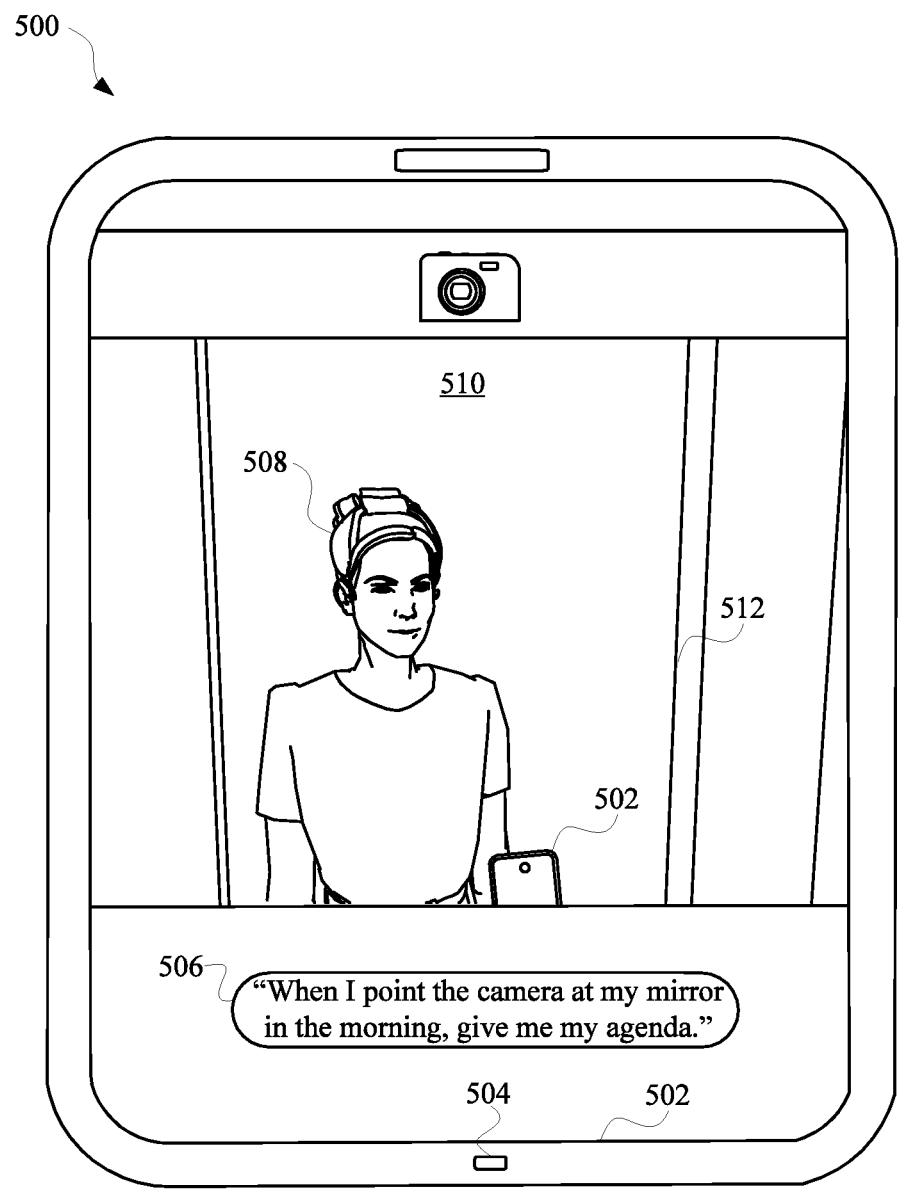
FIG. 5A illustrates a view of a user creating an image shortcut setting in which an assistant application operating on a computing device is responsive to the user directing a camera of the computing device at a mirror.

FIG. 5A illustrates a view 500 of a user 508 creating an image shortcut setting in which an assistant application operating on a computing device 502 is responsive to the user 508 directing a camera of the computing device 502 at a mirror 512. The user 508 can initialize the creation of the image shortcut setting by providing a verbal or textual command 506 to an interface of the computing device 502, such as the microphone 504. The command 506 can include the phrase "When I point the camera at a mirror in the morning, give me my agenda." The phrase can be processed at the computing device 502 or a separate device, as discussed herein, in order to identify parameters for generating the image shortcut setting. Because the phrase includes a contextual condition (e.g., "in the morning"), the function associated with the image shortcut setting can include a slot for time. Furthermore, the assistant can infer a contextual condition of location, at least based on the user identifying their own property (i.e., "my mirror"), therefore a slot of the function can correspond to location. In this way, the agenda requested by the user 508 will only be provided when the user 508 is at their home, and in front of their mirror in the morning. In some implementations, the function can also include a slot associated with a facial recognition of the user 508. In this way, the function will only be executed if the assistant application determines that the face in the mirror is the face of the user 508 and not another person that is accessing the camera of the computing device 502. For instance, the image presented at an interface 510 of the computing device 502 can be processed and/or otherwise compared to an image of a face of the user 508 to verify that the image at the interface 510 includes the face of the user 508. The verification can be acknowledged by the assistant application, which can proceed with executing the function associated with the image shortcut setting.

Figure 5B:
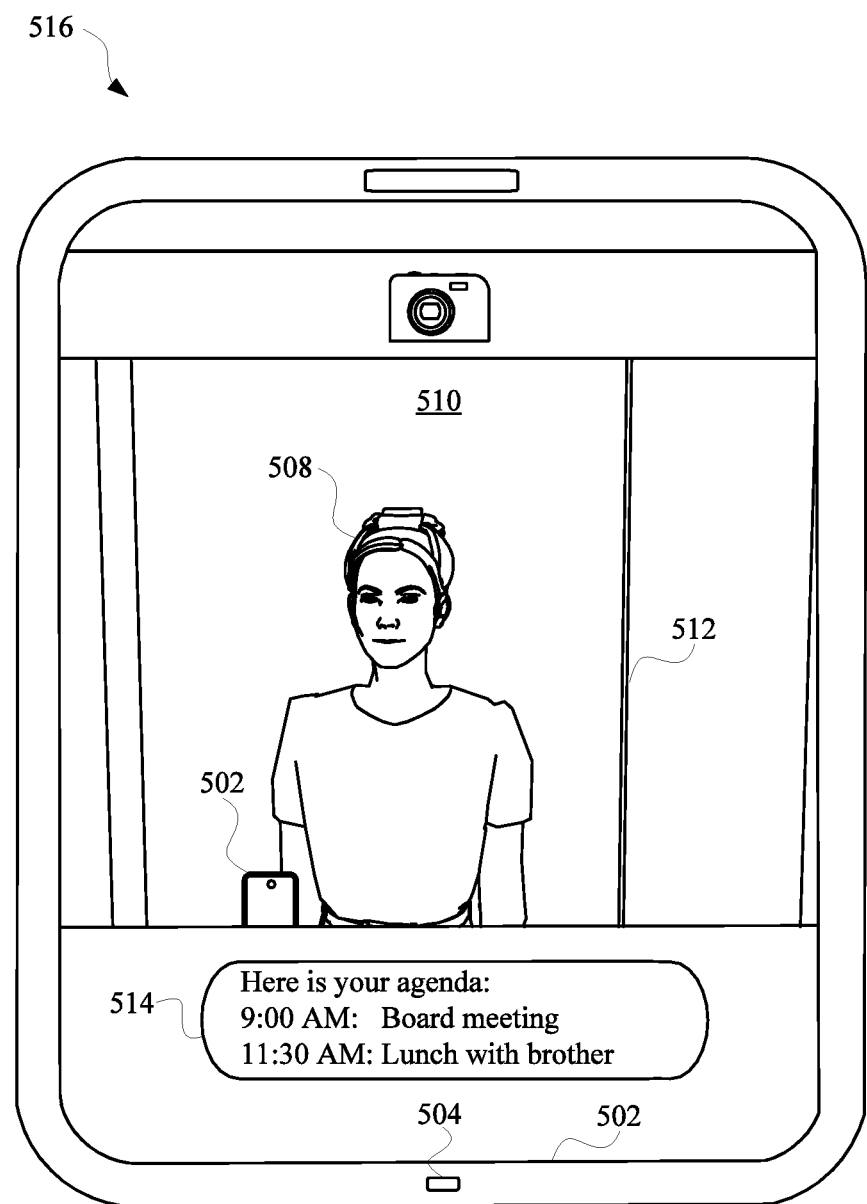
FIG. 5B illustrates a view of the user invoking the assistant application to perform a function in accordance with an image shortcut setting.

FIG. 5B illustrates a view 516 of the user 508 invoking the assistant application to perform a function in accordance with an image shortcut setting. Specifically, the user 508 illustrated in FIG. 5B can invoke the assistant application by directing the computing device 502 at a mirror 512 in order that an image of the user 508 and/or the mirror 512 can be processed. The image of the user 508, as presented at the interface 510, can be processed at the computing device 502 or a remote device for identifying the user 508, the computing device 502, the mirror 512, and/or any other object(s) that can be associated with the image shortcut setting. Object identifiers generated based on the image can be provided to the assistant application, along with contextual data or a context identifier such as a time of day, a location, and/or any other data that can be associated with a context of an image. When the object identifier(s) and/or the contextual data satisfies the conditions of an image shortcut setting, a function associated with the image shortcut setting can be executed. For instance, in response to the user 508 directing the camera at the mirror 512, the assistant application can access a calendar application at the computing device 502 or a remote device that hosts a calendar application. The assistant application can retrieve a list of items for the day, and cause the list of items to be graphically represented at the interface 510, as provided in output 514 of FIG. 5B. In this way, the user 508 is able to perform functions with their computing device 502 that were previously limited to invocation through verbal or textual commands.

In some implementations, the user can cause the automated assistant to perform actions associated with the image shortcut settings by opening up an image for display at the computing device 502. For instance, the computing device 502 can store a camera roll that includes images captured by the camera of the computing device 502. Alternatively, the computing device 502 can include a browser for searching images on the internet. If an image accessed by the computing device 502 includes an object corresponding to an image shortcut setting, the automated assistant can perform an action corresponding to the image shortcut setting. For instance, the user can set reminders associated with persons that are identified in particular images available to the computing device 502. A command for establishing the image shortcut setting can be, for example, "When you see an image of Matthew, remind me to video call Matthew and Jane." In this way, whenever the user opens an image that includes Matthew or directs a camera of the computing device 502 at Matthew, the automated assistant will cause a reminder to be presented to the user. For instance, the automated assistant can generate an audible response such as, for example, "Remember to video call Matthew and Jane."

Figure 6:
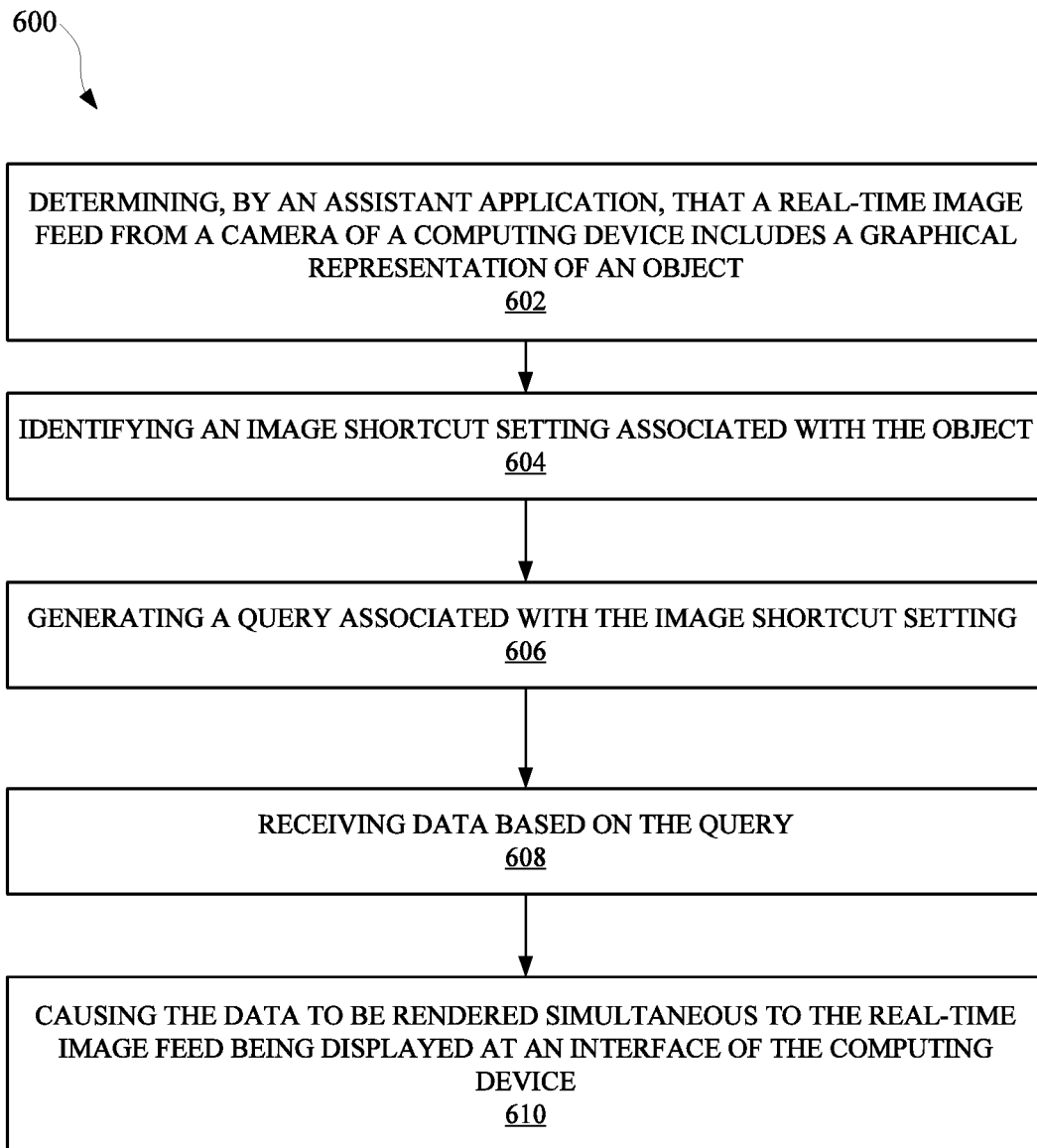
FIG. 6 illustrates a method for causing an assistant application to provide data to a user according to an image shortcut setting of the assistant application.

FIG. 6 illustrates a method 600 for causing an assistant application to provide data to a user according to an image shortcut setting of the assistant application. The method 600 can be performed by a computing device, a server device, and/or any other apparatus suitable for providing data. The method 600 can include a block 602 of determining, by an assistant application that a real-time image feed from a camera of a computing device includes a graphical representation of an object. The object can be any tangible object that can be captured in an image generated by a camera. Furthermore, the real-time image feed can be a video feed that is presented at a graphical user interface (e.g., a touch screen display) of the computing device. The assistant application can be an automated assistant that is hosted at the computing device or a remote device (e.g., a server device that is separate from the computing device), and can be configurable by the user, either directly or indirectly according to actions performed by the user.

The method 600 can include a block 604 of identifying an image shortcut setting associated with the object. The image shortcut setting 120 can be associated with a preconfigured process through which the assistant application responds to image content provided in the real-time image feed. For instance, the process can include the assistant application providing nutritional data about food when the user directs the camera at the food. The nutritional data can be provided by source that is requested by the user, or a source that is identified through a search engine query that is initialized by the assistant application.

The method 600 can include a block 606 of generating a query associated with the image shortcut setting. The query can be a request for data that is identified in the image shortcut setting. The query can be a request to access data available at an application of the computing device or a remote device that is separate from the computing device. However, in some embodiments, the block 606 can include generating a command associated with the image shortcut setting for controlling a peripheral device. In this way, the peripheral device can receive a command from the computing device in response to the user directing their camera at the object.

The method 600 can include a block 608 of receiving, based on the query, the data requested by the assistant application. The data can be received from a separate application or remote device that is capable of responding to queries from the assistant application. For instance, the data can be received from an agent application associated with a third party that has provided the agent application to assist the user in receiving a service (e.g., ordering an item, generating estimates from available data, etc.).

The method 600 can further include a block 610 of causing the data to be rendered simultaneous to the real-time image feed being displayed at an interface of the computing device. For instance, the user can be directing the camera of their computing device at a food item, such as an apple, to cause the assistant application to provide nutritional information about the apple while the apple is graphically represented at an interface of the computing device.

Figure 7:
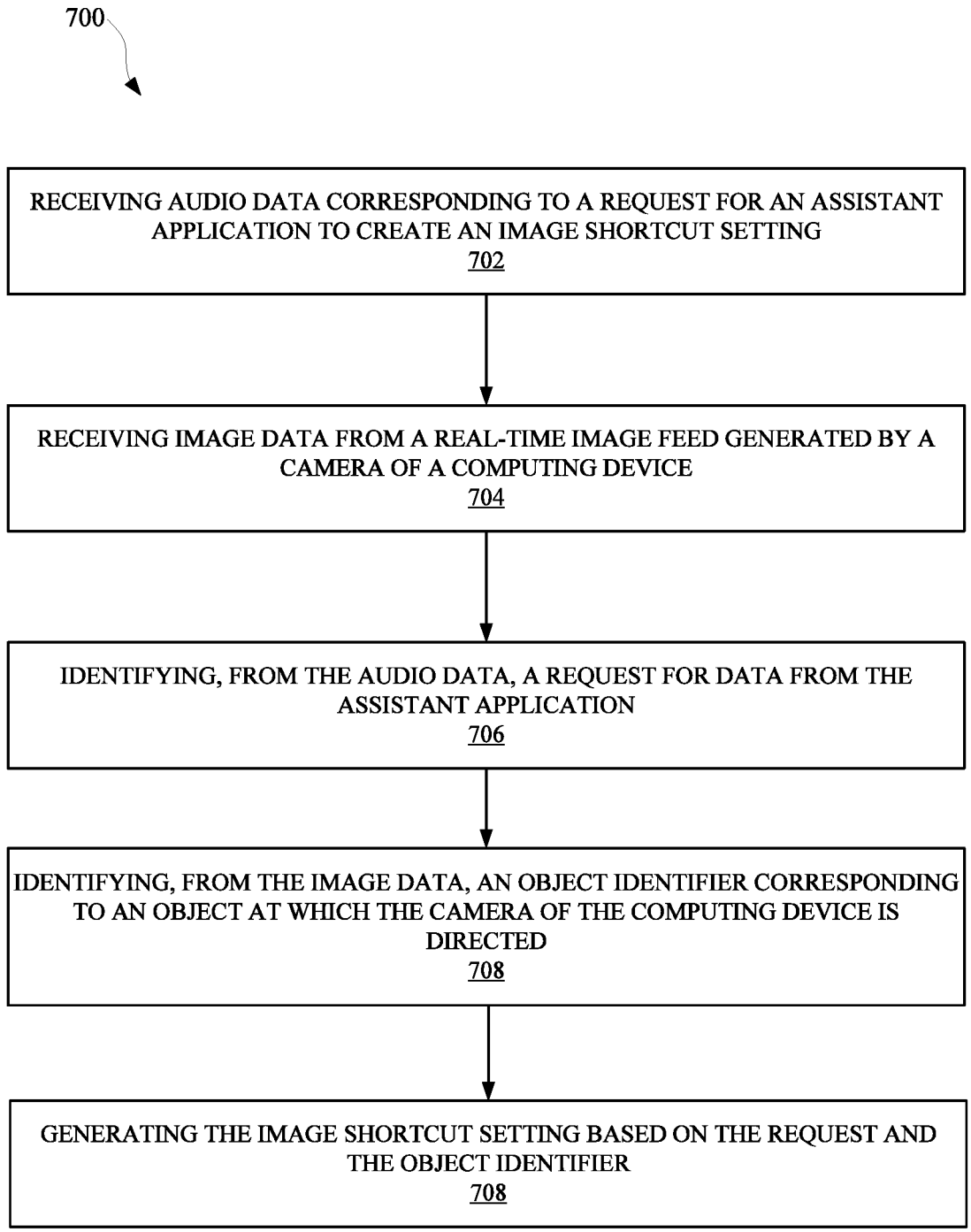
FIG. 7 illustrates a method for generating an image shortcut setting according to at least a command from a user.

FIG. 7 illustrates a method 700 for generating an image shortcut setting according to at least a command from a user. The method 700 can be performed by a computing device, a server device, and/or any other device capable of interpreting commands from a user. The method 700 can include a block 702 of receiving audio data corresponding to a request for an assistant application to create an image shortcut setting. The image shortcut setting can correspond to a process by which the assistant application is responsive to one or more objects being present in a viewing range of a camera of a computing device. The objects can be designated by the user and identified by the assistant application or a separate application that is capable of identifying objects using camera data and a computer vision algorithm.

The method 700 can include a block 704 of receiving image data from a real-time image feed generated by the camera of the computing device. The real-time image feed can be image data or sensor data generated by the camera in real time as the camera is being directed at an object. The real-time image feed can be graphically represented at a graphical user interface (e.g., a touch display interface) of the computing device, allowing the user to confirm that the object is in the viewing range of the camera. This also allows the user to provide the command for creating the image shortcut setting while the object is displayed at the computing device.

The method 700 can include a block 706 of identifying, from the audio data, a request for data from the assistant application. The request for data can be identified by causing the audio data to be converted into textual data through a speech recognition algorithm that can be performed at the computing device or a remote device (e.g., a server device). In some implementations, instead of audio data being received at block 702, textual data can be received as a query or request for an automated assistant to create an image shortcut setting. The textual data can be received at an assistant interface, such as a graphical user interface that includes one or more fields for receiving hand-typed textual data. The textual data can then by processed by the assistant application to determine that a request was included in the data received at block 702, and to identify the type of data that has been requested by the user. For instance, a request to receive weather data in response to the user directing their camera at the sky can be embodied in the textual data extracted from the audio data or the hand-typed textual data.

The method 700 can also include a block 708 of identifying, from the image data, an object identifier corresponding to an object at which the camera of the computing device is directed. The image data can be processed by the assistant application, the computing device, a separate computing device (e.g., a server device), and/or any other apparatus capable of processing image data. The image data can be provided to one or more machine learning models for identifying objects within image data, or otherwise input to a computer vision algorithm for generating object identifiers and locations of objects from the image data. The assistant application can thereafter use the object identifiers and/or the locations of the objects when executing a function associated with an image shortcut setting.

The method 700 can further include a block 710 of generating the image shortcut setting based on the request for data and the object identifier. The image shortcut setting can be generated by the assistant application in order to provide a process through which the user can direct the assistant application to perform an action (e.g., retrieve weather data) when the user is directing the camera at the object (e.g., the sky). In this way, the user does not necessarily have to provide a textual or verbal input to the computing device to retrieve data but, rather, can merely point the camera of the computing device at an object.

Figure 8:
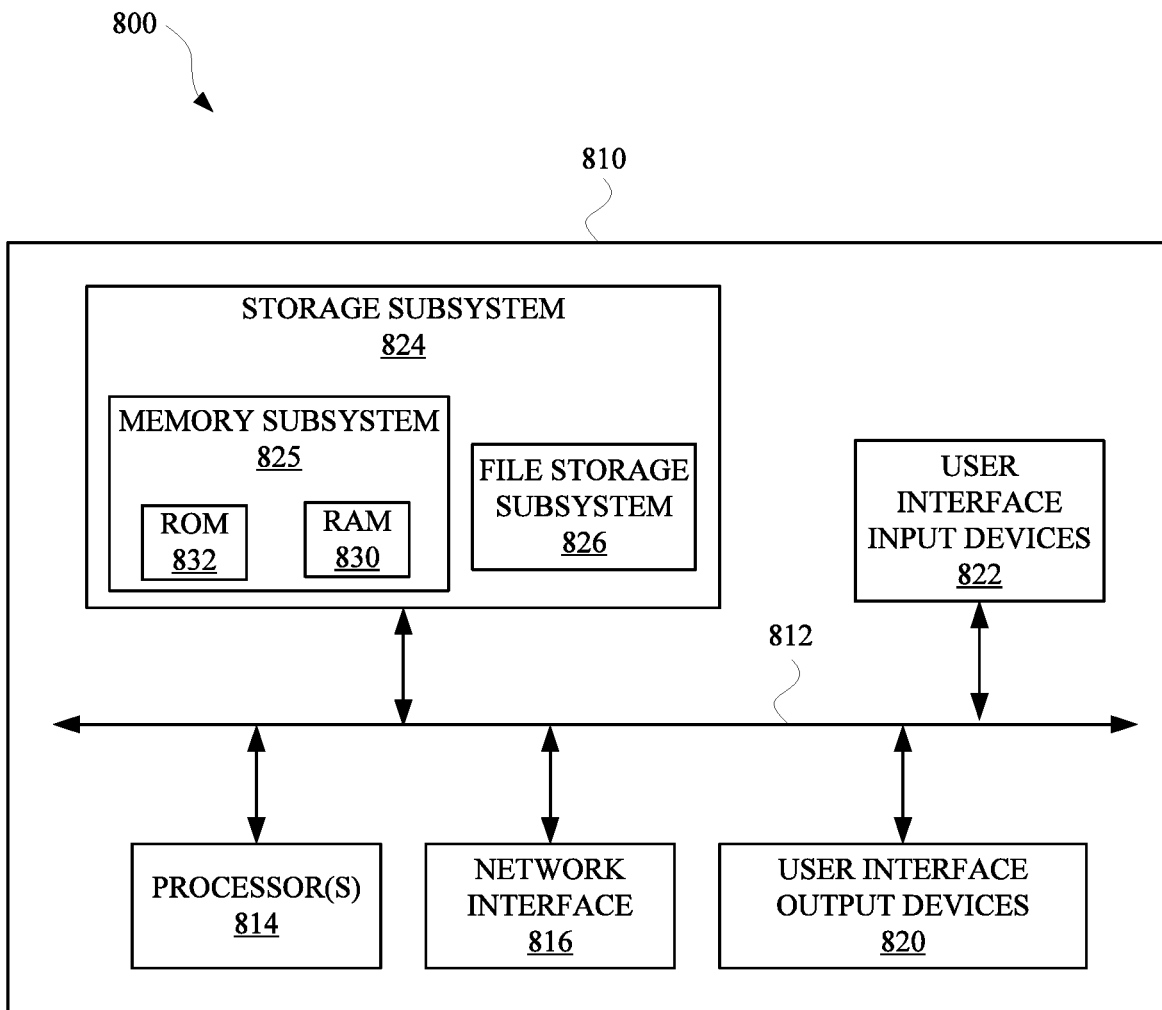
FIG. 8 is a block diagram of an example computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to perform selected aspects of method 600, method 700, and/or to implement one or more of the computing device 102, computing device 202, computing device 302, computing device 402, computing device 502, server device 112, remote device 124, and/or any other implementation discussed herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A computing device, comprising:
a microphone;
a display device;
a front facing camera that faces in the same direction as the display device;
a speaker;
one or more processors in communication with the front facing camera, the microphone, the display device, and the speaker; and
memory configured to store instructions that, when executed by the one or more processors, cause one or more of the processors to:
process one or more images, generated by the front facing camera, to determine that one or more of the images include:
an object, and
a face of a particular user;
responsive to determining that the one or more images include the object and the face of the particular user:
invoke an image shortcut setting, wherein the image shortcut setting is generated in response to one or more previous inputs from the particular user to an automated assistant application of an automated assistant, and wherein invoking the image shortcut setting causes the automated assistant to perform one or more computer actions.

2. The computing device of claim 1, wherein the one or more computer actions performed by the automated assistant comprise transmitting one or more commands that cause the state of an Internet of Things device to be altered.

3. The computing device of claim 1, wherein the one or more computer actions performed by the automated assistant comprise transmitting a generated query, receiving responsive data in response to transmitting the generated query, and causing at least a portion of the responsive data to be rendered at the computing device.

4. The computing device of claim 1, wherein the one or more computer actions performed by the automated assistant comprise transmitting an electronic communication to a contact of the particular user.

5. The computing device of claim 1, wherein one or more of the processors are further to:

prior to processing the one or more images, generate the image shortcut setting, wherein in generating the image shortcut setting one or more of the processors are to:
  receive a spoken utterance from the particular user,
  determine, in response to receiving the spoken utterance, that natural language content of the spoken utterance includes a term that identifies the object and further includes a request to create the image shortcut setting corresponding to the object, and
  generate, based on determining that the spoken utterance includes the term and the request, the image shortcut setting.

6. The computing device of claim 1, wherein the front facing camera provides a real-time image feed that is rendered at the display device.

7. The computing device of claim 1, wherein in invoking the image shortcut setting, one or more of the processors are to invoke the image shortcut setting further based on a time or date, corresponding to capturing of the one or more images, matching a temporal condition for invoking the image shortcut setting.

8. A method implemented by one or more processors, the method comprising:

processing one or more images, generated by a camera of a client device, to determine that one or more of the images include:
  an object, and
  a face of a particular user;
responsive to determining that the one or more images include the object and the face of the particular user:
  invoking an image shortcut setting,
    wherein the image shortcut setting is generated in response to one or more previous inputs from the particular user to an automated assistant application of an automated assistant, and
    wherein invoking the image shortcut setting causes the automated assistant to perform one or more computer actions.

9. The method of claim 8, wherein the one or more computer actions performed by the automated assistant comprise transmitting one or more commands that cause the state of an Internet of Things device to be altered.

10. The method of claim 8, wherein the one or more computer actions performed by the automated assistant comprise transmitting a generated query, receiving responsive data in response to transmitting the generated query, and causing at least a portion of the responsive data to be rendered at the computing device.

11. The method of claim 8, wherein the one or more computer actions performed by the automated assistant comprise transmitting an electronic communication to a contact of the particular user.

12. The method of claim 8, wherein the method further comprises:

prior to processing the one or more images, generating the image shortcut setting, wherein generating the image shortcut setting includes:
  receiving a spoken utterance from the user,
  determining, in response to receiving the spoken utterance, that natural language content of the spoken utterance includes a term that identifies the object and further includes a request to create the image shortcut setting corresponding to the object, and
  generating, based on determining that the spoken utterance includes the term and the request, the image shortcut setting.

13. The method of claim 8, wherein the camera is a front facing camera that faces the same direction as a display of the client device.

14. The method of claim 8, further comprising:

determining that a time or date, corresponding to capturing of the one or more images, matches a temporal condition for invoking the image shortcut setting;
wherein invoking the image shortcut setting is further based on the time or date matching the temporal condition for invoking the image shortcut setting.

15. At least one non-transitory computer readable medium storing instructions that, when executed by processor, cause the processor to:

process one or more images, generated by a camera of a client device, to determine that one or more of the images include:
  an object, and
  a face of a particular user;
responsive to determining that the one or more images include the object and the face of the particular user:
  invoke an image shortcut setting,
    wherein the image shortcut setting is generated in response to one or more previous inputs from the particular user to an automated assistant application of an automated assistant, and
    wherein invoking the image shortcut setting causes the automated assistant to perform one or more computer actions.

* * * * *